United States Patent [19]

Weinberger

[11] 4,348,736

[45] Sep. 7, 1982

[54] PROGRAMMABLE LOGIC ARRAY ADDER

[75] Inventor: Arnold Weinberger, Poughkeepsie, N.Y.

[73] Assignee: International Business Machines Corp., Armonk, N.Y.

[21] Appl. No.: 171,215

[22] Filed: Jul. 22, 1980

Related U.S. Application Data

[63] Continuation of Ser. No. 948,720, Oct. 5, 1978, abandoned, which is a continuation-in-part of Ser. No. 866,688, Jan. 3, 1978, abandoned.

[51] Int. Cl.³ .................................................. G06F 7/50
[52] U.S. Cl. ..................................... 364/787; 364/716
[58] Field of Search ................................. 364/787, 716

[56] References Cited

U.S. PATENT DOCUMENTS

| | | | |
|---|---|---|---|
| 3,925,652 | 12/1975 | Miller | 364/787 |
| 3,983,538 | 9/1976 | Jones | 364/716 |
| 3,987,287 | 10/1976 | Cox et al. | 364/716 X |
| 3,993,891 | 11/1976 | Beck et al. | 364/787 |
| 4,157,590 | 6/1979 | Grice et al. | 364/787 |

OTHER PUBLICATIONS

Brickman et al., "Programmable Logic Array One-Cycle Split Adder", *IBM Tech. Disclosure Bulletin*, vol. 17, No. 12, May 1975, pp. 3653-3655.

*Primary Examiner*—David H. Malzahn
*Attorney, Agent, or Firm*—James E. Murray

[57] ABSTRACT

This specification discloses a multi digit binary adder embodied in programmable logic arrays (PLAs). The particular programmable logic array used here has a separate two-bit decoder for receiving each like order pairs of digits $A_i$, $B_i$ of two n digit binary numbers $A_0$, $A_1 \ldots A_{n-1}$ and $B_0$, $B_1 \ldots B_{n-1}$ plus a carry $C_{in}$. The decoders generate an output signal called a minterm on a different line for each of the four possible combinations $\bar{A}_i \cdot \bar{B}_i$, $\bar{A}_i \cdot B_i$, $A_i \cdot \bar{B}_i$ and $A_i \cdot B_i$ of the true and complement of each pair. The minterms from the decoders are fed to an array called the product term generator or AND array which generates product terms $$f_p = f_0(A_0, B_0) \cdot f_1(A_1, B_1) \cdots$$
$$f_{n-1}(A_{n-1}, B_{n-1}) \cdot f_n(C_{in})$$

The product terms are fed to a second array called a sums of product terms generator or OR array that sums product terms $f_p$. A series of latches is last in the sequence of logic elements making up the PLA. These latches each perform an Exclusive-OR function to generate a sum bit $S_i$ that is an Exclusive-OR of two functions supplied by the OR array to the inputs of the latches to generate a sum $S_0, S_1 \ldots S_{n-1}$ plus a carry $C_{out}$ for the adder at the output of the PLA. The adder is optimized for a PLA with latches that perform an Exclusive-OR function and is more efficient than known adders embodied in PLAs, in which the output latches perform an AND function.

13 Claims, 14 Drawing Figures

FIG. 1

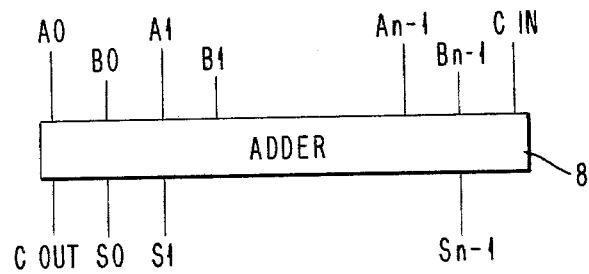

$(A0, \ldots, An-1)$ = ADDEND  
$(B0, \ldots, Bn-1)$ = AUGEND  $\Big\}$ OF n-BIT ADDER WHERE  
$(S0, \ldots, Sn-1)$ = SUM $\quad 0, \ldots, n-1$ HIGH TO LOW ORDER

C IN = INPUT CARRY  
C OUT = OUTPUT CARRY = CO

FIG. 3

| $\overline{A_i} \cdot \overline{B_i}$ | $\overline{A_i} \cdot B_i$ | $A_i \cdot \overline{B_i}$ | $A_i \cdot B_i$ | | |
|---|---|---|---|---|---|
| 0 | 0 | 0 | 0 | $\overline{A_i} \cdot \overline{B_i} + \overline{A_i} \cdot B_i + A_i \cdot \overline{B_i} + A_i \cdot B_i = 1$ | = DON'T CARE (TRUE) |
| 0 | 0 | 0 | 1 | $\overline{A_i} \cdot \overline{B_i} + \overline{A_i} \cdot B_i + A_i \cdot \overline{B_i}$ | $= \overline{A_i} + \overline{B_i} = \overline{G_i}$ |
| 0 | 0 | 1 | 0 | $\overline{A_i} \cdot \overline{B_i} + \overline{A_i} \cdot B_i \quad\quad + A_i \cdot B_i$ | $= \overline{A_i} + B_i$ |
| 0 | 0 | 1 | 1 | $\overline{A_i} \cdot \overline{B_i} + \overline{A_i} \cdot B_i$ | $= \overline{A_i}$ |
| 0 | 1 | 0 | 0 | $\overline{A_i} \cdot \overline{B_i} \quad\quad + A_i \cdot \overline{B_i} + A_i \cdot B_i$ | $= A_i + \overline{B_i}$ |
| 0 | 1 | 0 | 1 | $\overline{A_i} \cdot \overline{B_i} \quad\quad + A_i \cdot \overline{B_i}$ | $= \overline{B_i}$ |
| 0 | 1 | 1 | 0 | $\overline{A_i} \cdot \overline{B_i} \quad\quad\quad\quad + A_i \cdot B_i$ | $= \overline{A_i \forall B_i} = \overline{H_i}$ |
| 0 | 1 | 1 | 1 | $\overline{A_i} \cdot \overline{B_i}$ | $= \overline{A_i} \cdot \overline{B_i} = \overline{P_i}$ |
| 1 | 0 | 0 | 0 | $\overline{A_i} \cdot B_i + A_i \cdot \overline{B_i} + A_i + B_i$ | $= A_i + B_i = P_i$ |
| 1 | 0 | 0 | 1 | $\overline{A_i} \cdot B_i + A_i \cdot \overline{B_i}$ | $= A_i \forall B_i = H_i$ |
| 1 | 0 | 1 | 0 | $\overline{A_i} \cdot B_i \quad\quad + A_i \cdot B_i$ | $= B_i$ |
| 1 | 0 | 1 | 1 | $\overline{A_i} \cdot B_i$ | $= \overline{A_i} \cdot B_i$ |
| 1 | 1 | 0 | 0 | $A_i \cdot \overline{B_i} + A_i \cdot B_i$ | $= A_i$ |
| 1 | 1 | 0 | 1 | $A_i \cdot \overline{B_i}$ | $= A_i \cdot \overline{B_i}$ |
| 1 | 1 | 1 | 0 | $A_i \cdot B_i$ | $= A_i \cdot B_i = G_i$ |
| 1 | 1 | 1 | 1 | | $= 0$ = FALSE |

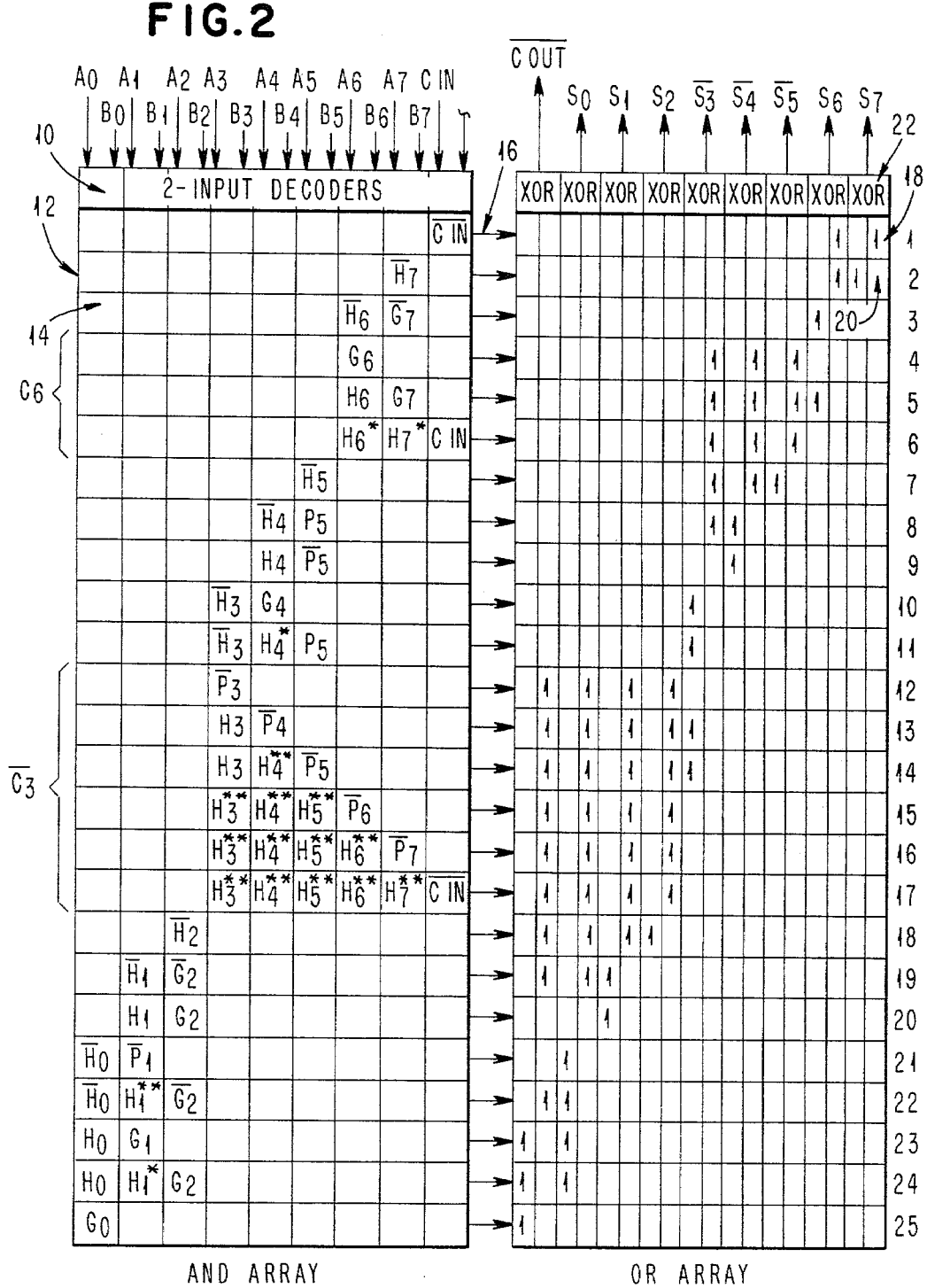

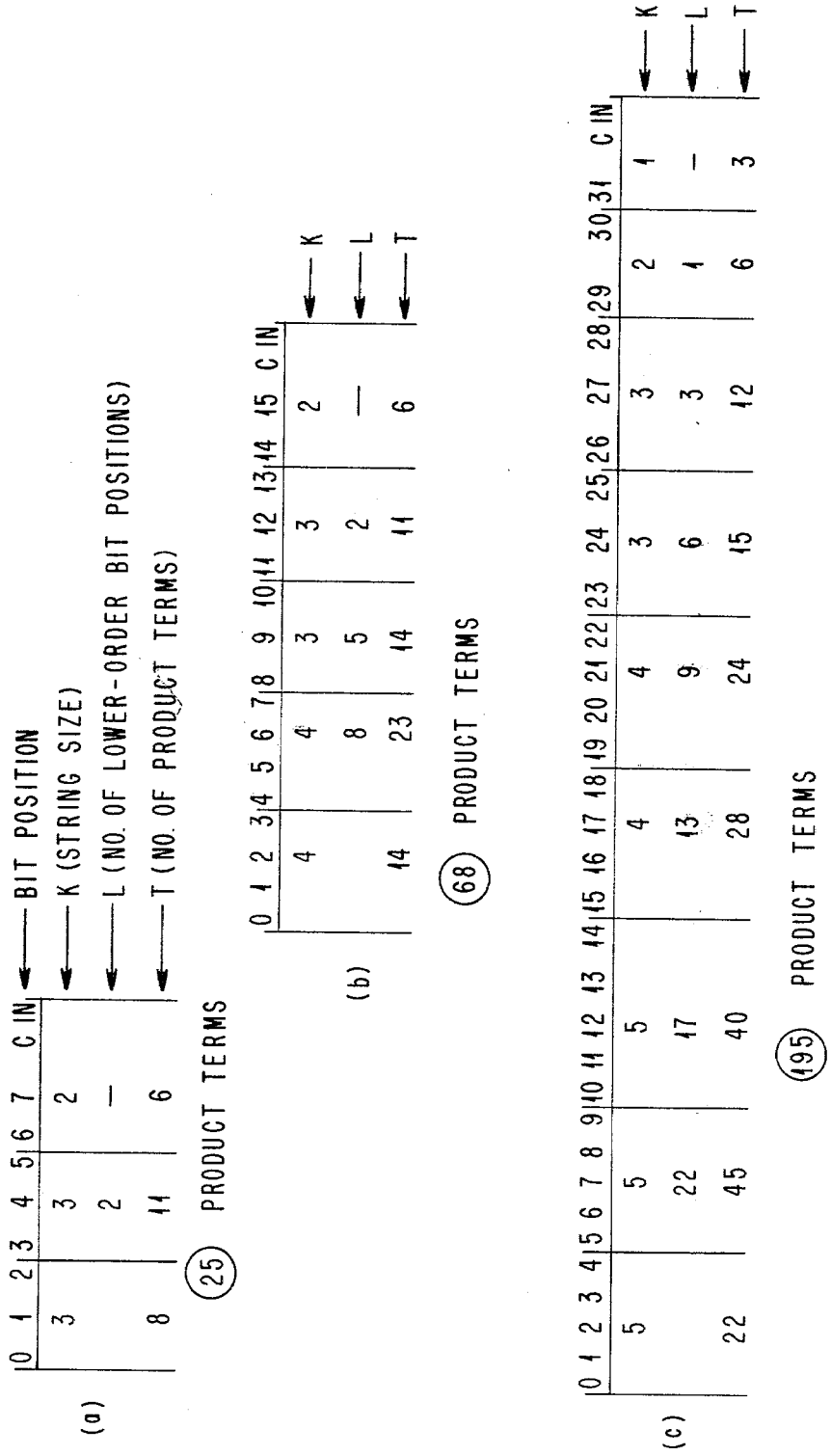
FIG. 4 NUMBER OF PRODUCT TERMS FOR (a) 8 BIT ADDER, (b) 16 BIT ADDER, & (c) 32 BIT ADDER USING A CONVENTIONAL PLA

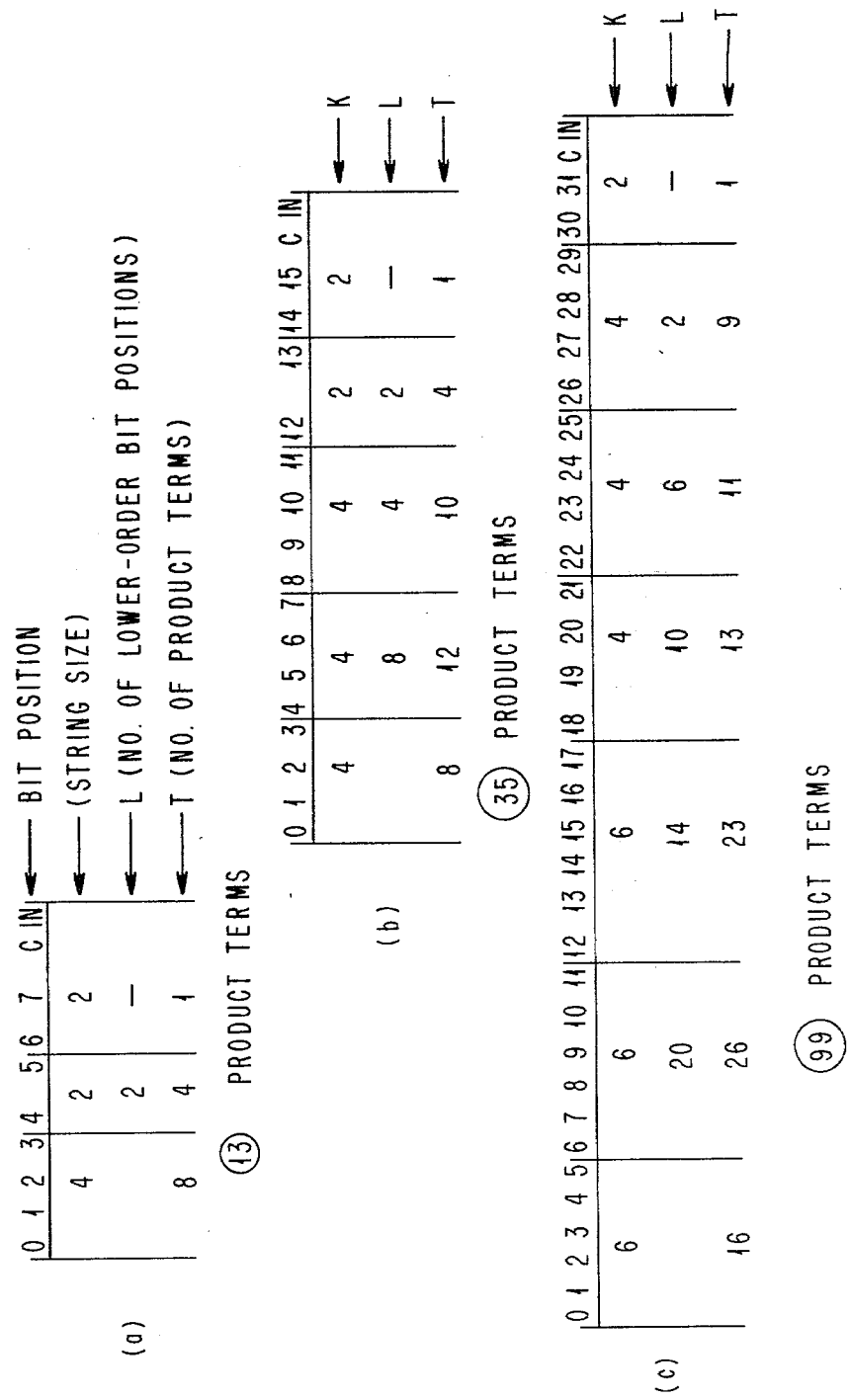
FIG.7 NUMBER OF PRODUCT TERMS FOR (a) 8 BIT ADDER, (b) 16 BIT ADDER, AND (c) 32 BIT ADDER USING A PLA WITH 4-INPUT & 5 INPUT DECODERS

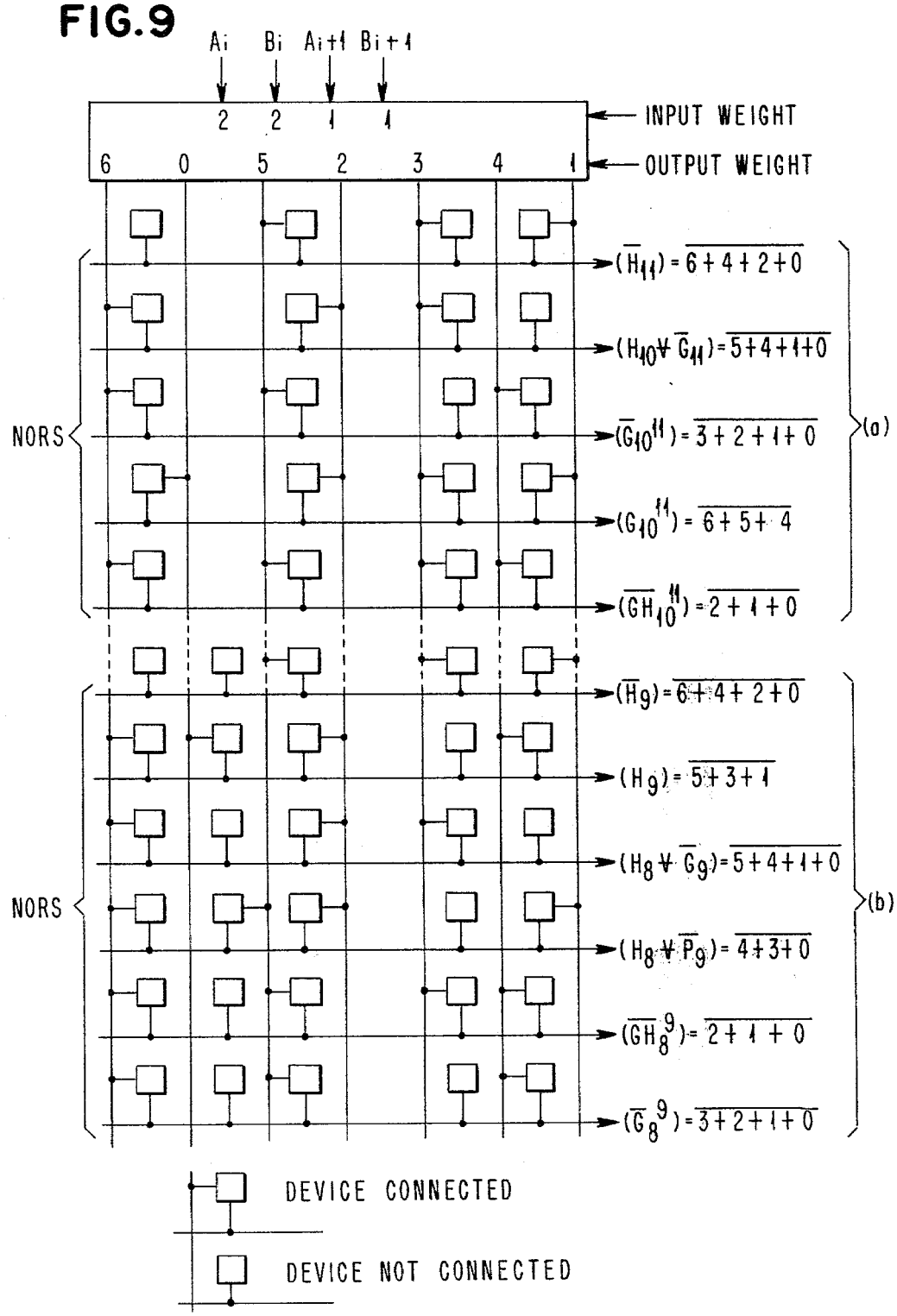

PROGRAMMABLE LOGIC ARRAY ADDER

RELATED APPLICATIONS

This is a continuation of co-pending patent application Ser. No. 948,720 filed Oct. 5, 1978 now abandoned and entitled, "Programmable Logic Array Adder" which in turn was a continuation-in-part of a co-pending application Ser. No. 866,688 now abandoned filed Jan. 3, 1978 and entitled, "Programmable Logic Array Adder".

BACKGROUND OF THE INVENTION

The present invention relates to adders and more particularly relates to adders which are embodied in programmable logic arrays.

The performing of logic in an array of identical circuit elements each located at a unique intersection of an input and output line in a grid of intersecting input and output lines is well known. There are many such arrangements of arrays for performing logic. One of them is called a programmable logic array (PLA). An example of one type of PLA can be seen in Cox et al U.S. Pat. No. 3,987,287. In this PLA input decoders generate minterms and feed them into a first array called a product term generator or an AND array to generate product terms which are functions of the inputs to the decoders. These product terms are fed to a second array called a sums of product terms generator or OR array so as to increase the number of functions that can be performed using these product terms without geometrically increasing the size of the AND array needed to perform these functions. The output of the OR array is fed to latches so that both sequential and combinatorial logic can be performed using this PLA.

The logical function performed by these latches is usually an AND function, as shown in co-pending application Ser. No. 866,689 filed Jan 3, 1978, entitled "Programmable Logic Array Adder" now issued into U.S. Pat. No. 4,157,590. However, in certain PLAs the latches perform an Ex-OR function. Pages 3653 to 3655 of the May 1975 issue of the *IBM Technical Disclosure Bulletin* describe an adder which is embodied in PLAs of this type. While such an adder is useful, it has no advantage over an adder embodied in a programmable logic array in which the latches performed an AND function.

THE INVENTION

In accordance with the present invention a new carry lookahead adder is provided using programmable logic arrays with output latches that perform an Ex-OR function. This adder is more efficient than presently known adders embodied in PLAs having latches that perform AND functions. This adder has means for feeding every line order set of digits $A_i$, $B_i$ of two multi digit numbers $A_0, A_1, \ldots A_{n-1}$ and $B_0, B_1 \ldots B_{n-1}$ into a separate two bit decoder of a PLA and including circuit means in the product term and sum of product term generating arrays to generate any order sum digit $S_i$ of a binary sum of two numbers $S_0, S_1 \ldots S_{n-1}$ as the output of one of the latches of the PLA in accordance with either of the following two formulas:

$$\overline{S_i} = \left\{ \begin{array}{l} \overline{H_i} \cdot G_{i+1} \\ + \overline{H_i} \cdot H^*_{i+1} \cdot G_{i+2} \\ \cdot \\ \cdot \\ + \overline{H_i} \cdot H^*_{i+1} \cdot \ldots \cdot H^*_{j-2} \cdot G_{j-1} \\ + \overline{H_i} \cdot H^*_{i+1} \cdot \ldots \cdot H^*_{j-2} \cdot H^*_{j-1} \cdot P_j \\ + H_i \cdot \overline{P}_{i+1} \\ + H_i \cdot H^{}_{i+1} \cdot \overline{P}_{i+2} \\ \cdot \\ \cdot \\ + H_i \cdot H^{}_{i+1} \cdot \ldots \cdot H^{**}_{j-1} \cdot \overline{P}_j \end{array} \right\}$$

$$\mathcal{V} \{\overline{H}_{i+1} + \ldots + \overline{H}_j + C_{j+1}\}$$

$$S_i = \left\{ \begin{array}{l} \overline{H_i} \cdot \overline{P}_{i+1} \\ + \overline{H_i} \cdot H^{}_{i+1} \cdot \overline{P}_{i+2} \\ \cdot \\ \cdot \\ + \overline{H_i} \cdot H^{}_{i+1} \cdot \ldots \cdot H^{}_{j-2} \cdot \overline{P}_{j-1} \\ + \overline{H_i} \cdot H^{}_{i+1} \cdot \ldots \cdot H^{}_{j-2} \cdot H^{}_{j-1} \cdot \overline{G}_j \\ + H_i \cdot G_{i+1} \\ + H_i \cdot H^*_{i+1} \cdot G_{i+2} \\ \cdot \\ \cdot \\ + H_i \cdot H^*_{i+1} \cdot \ldots \cdot H^*_{j-1} \cdot G_j \end{array} \right\}$$

$$\mathcal{V} \{\overline{H}_{i+1} + \ldots + \overline{H}_j + \overline{C}_{j+1}\}$$

where $$G_i = A_i \cdot B_i \quad \overline{G_i} = \overline{A_i} + \overline{B_i}$$

$$P_i = A_i + B_i \quad \overline{P_i} = \overline{A_i} \cdot \overline{B_i}$$

$$H_i = A_i \not\!\!\vee B_i \quad \overline{H_i} = \overline{A_i \not\!\!\vee B_i} = \overline{A_i} \not\!\!\vee B_i = A_i \not\!\!\vee \overline{B_i}$$

*indicates that an order $P$ may be substituted for the indicated $H$ term

**indicates that an order $\overline{G}$ may be substituted for the indicated $H$ term Other improvements are in the generating of the carry out digit and in the arrangement of the strings of sum digits to produce the most efficient use of product terms. Therefore it is an object of the present invention to generate a new adder for embodiment in programmable logic array structures.

It is another object of the invention to generate a new adder for use in a programmable logic array structure that has latches that perform an Ex-OR function.

It is a further object of the invention to provide an array logic adder which requires less product terms than known array logic adders.

THE DRAWINGS

These and other objects of the invention will be apparent from the particular description of the preferred embodiment of the invention of which:

FIG. 1 is a schematic representation of an adder;

FIG. 2 is a diagram showing an adder in accordance with the present invention;

FIG. 3 is a table showing logical functions that can be performed in the AND array of a programmable logic array being fed by two-bit decoders;

FIG. 4 is a diagram showing the arrangement of strings of product terms in adders in accordance with the present invention fabricated in a conventional PLA arrangement;

FIG. 7 is a diagram illustrating string sizes for the decoder of FIG. 6;

FIG. 9 is a diagram of an AND array using a reduced number of elements in the adder of FIG. 6;

EMBODIMENT OF THE INVENTION

Figure 5:
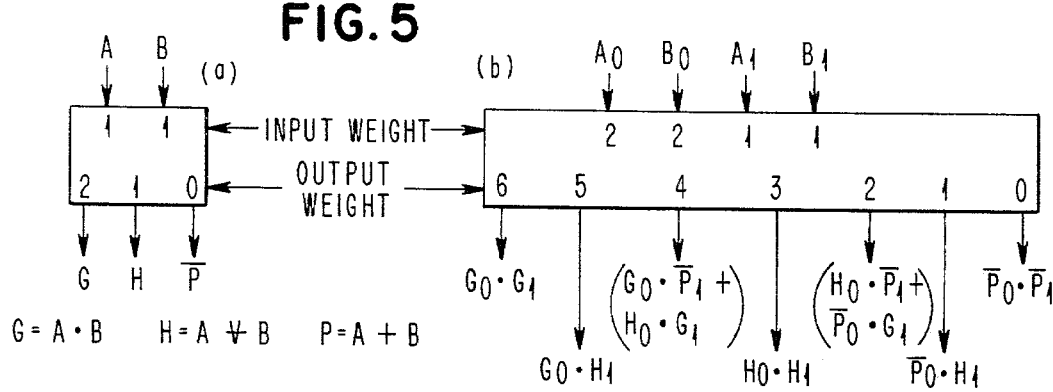
FIG. 5 is a block diagram comparing two input and four input special decoders.

FIG. 1 shows two n-bit numbers $A_0A_1 \ldots A_{n-1}$ and $B_0B_1 \ldots B_{n-1}$ being added together with an input carry $C_{in}$, by circuitry to produce an n-bit sum $S_0S_1 \ldots S_{n-1}$ and an output carry $C_{out}$. The circuitry 8 performing the adder function is in the form of programmable logic arrays (PLAs) shown schematically in FIG. 2.

In FIG. 2 corresponding bits of two 8-bit numbers $A_0, A_1 \ldots A_7$ and $B_0, B_1 \ldots B_7$ are fed in pairs to 2-bit decoders 10. The decoders 10 each generate a pulse on a different one of four output lines for each of the four possible combinations of the true and complement of the input bits $A_i$ and $B_i$ supplied to them. Each output line of any decoder 10 is connected to a separate input line of an AND array 12. The blocks 14 in FIG. 2 represent the intersection of each set of four input lines from one decoder 10 with an output line 16. Within each block 14 there are four possible NOR gate connections. These NOR gates are used to connect any or all of the input lines of the set to the output line 16 passing through the block 14. Selective connection of the input lines to the output line allows one of 16 different logical functions to be performed in any block on the two inputs $A_i$ and $B_i$ to one of the decoders 10 and placed on that output line by the combination of the decoders and the NOR gates within one of the blocks 14.

The different logical functions are shown in the table of FIG. 3. In the table, each of the four columns represents one of the input lines in a four input line set of the AND array. The heading on the columns indicates the combination of true and/or complements of the inputs $A_i$ and $B_i$ fed to the decoder 10 connected to that set of input lines which produces a pulse on the input line represented by the column. The legend on the sixteen rows of the table are all the possible functions that can be performed in the two inputs $A_i$ and $B_i$ to the decoder. The squares formed by the intersection of a row and column each represents an intersection between the input line represented by the column and the output line passing through the block. The number 1 in any square indicates there must be a connection between the input line and the output line at that intersection to generate the function indicated by the legend for that row while the number 0 in the box indicates that there must be no connection to generate that function. Of the 16 possible functions only 6 are of interest in the performance of addition in accordance with the present invention. These are marked $G_i$, $\overline{G_i}$, $P_i$, $\overline{P_i}$, $H_i$ and $\overline{H_i}$ in FIG. 3. Performing logic operations using arrays and 2-bit decoders in this manner is well known and can be found in Cox et al U.S. Pat. No. 3,987,287, issued Oct. 19, 1976.

Now referring solely to FIG. 2, the row of the AND array represents a product term. For example, row 3 in FIG. 2 contains the product term $H_6G_7$, where $H_6$ is a function of the inputs $(A_6, B_6)$ and $G_7$ is a function of $(A_7, B_7)$. A blank in any box 14 represents a "don't care" condition in the generation of the product term. The output line 16 for each row of the AND array is connected to an input line of an OR array 18. Each box 20 in the OR array represents the intersection of one of the input lines of the OR array with one of the output lines of the OR array. A 1 in any one box indicates a connection in the form of a NOR circuit between the input line and the output line at that intersection. An empty box 20 means there is no connection between the intersection of input and output lines represented by that particular box. Thus, each column of boxes 20 in the OR array 18 represents the OR of sum of the product terms in the AND array connected to the output line by the NOR circuits as denoted by the 1's in the boxes of the column. For example, the left-most column of the OR array represents the OR of the product terms shown in rows 23 through 25.

Pairs of adjacent OR columns are X-ORed into polarity-hold latches 22. The outputs of the Exclusive-OR circuits 22 are the outputs of the PLAs and the outputs of the adder. Thus, the output $C_{out}$ is the X-OR of the two left-most OR columns.

With this type of PLA, an adder design will now be developed, so that each output represents an X-OR of two functions, each function representing an OR of product terms. A product term will be an AND of functions of the individual bit position inputs to the adder, and the input carry.

$$\text{Product term} = f_0(A0,B0) \cdot f_1(A1,B1) \cdot \ldots f_{n-1}(A_{n-1},B_{n-1}) \cdot f_n(C_{in}) \tag{1}$$

The functions performed on corresponding bits $A_i$ and $B_i$ of the n bit inputs to the adder by the decoders 10 and the NOR circuits in one of the boxes 14 in the AND array are:

$$G_i = A_i \cdot B_i \quad \overline{G_i} = \overline{A_i} + \overline{B_i} \tag{2}$$

$$P_i = A_i + B_i \quad \overline{P_i} = \overline{A_i} \cdot \overline{B_i}$$

$$H_i = A_i \not\equiv B_i \quad \overline{H_i} = \overline{A_i \not\equiv B_i} = \overline{A_i} \not\equiv B_i = A_i \not\equiv \overline{B_i}$$

Using known carry-look ahead methods, any carry and its complement can be expressed as:

$$C_i = G_i \quad (3)$$
$$+ H_i^* \cdot G_{i+1}$$
$$\vdots$$
$$+ H_i^* \cdot H_{i+1}^* \cdot \ldots \cdot H_{n-2}^* \cdot G_{n-1}$$
$$+ H_i^* \cdot H_{i+1}^* \cdot \ldots \cdot H_{n-2}^* \cdot H_{n-1}^* \cdot C_{in}$$

$$\overline{C_i} = \overline{P_i} \quad (4)$$
$$+ H_i^{**} \cdot \overline{P_{i+1}}$$
$$\vdots$$
$$+ H_i^{} \cdot H_{i+1}^{} \cdot \ldots \cdot H_{n-2}^{**} \cdot \overline{P_{n-1}}$$
$$+ H_i^{} \cdot H_{i+1}^{} \cdot \ldots \cdot H_{n-2}^{} \cdot H_{n-1}^{} \cdot \overline{C_{in}}$$

A sum bit can be expressed as a function of the preceding carry and expanded to a function of some distant carry.

$$S_i = H_i \not{+} C_{i+1} = H_i \not{+} (G_{i+1}^j + H_{i+1}^j \cdot C_{j+1}) = (H_i \not{+} G_{i+1}^j) \quad (5)$$
$$\not{+} (H_{i+1}^j \cdot C_{j+1}) = (H_i \not{+} \overline{G_{i+1}^j}) \not{+} (\overline{H_{i+1}^j} + \overline{C_{j+1}})$$

$$\overline{S_i} = (H_i \not{+} \overline{C_{i+1}}) = H_i \not{+} (\overline{GH_{i+1}^j} + H_{i+1}^j \cdot \overline{C_{j+1}}) = \quad (6)$$
$$(H_i \not{+} \overline{GH_{i+1}^j}) \not{+} (H_{i+1}^j + \overline{C_{j+1}}) = (H_i \not{+} GH_{i+1}^j)$$
$$\not{+} (\overline{H_{i+1}^j} + C_{j+1})$$

where
$G_{i+1}{}^j$ = carry-generate condition for bit group $i+1$ through $j$ (high-to-low order)

$H_{i+j}$ = strict carry-propagate condition (mutually exclusive with $G_{i+j}$)
$GH_{i+j} = G_{i+j} + H_{i+j}$ = inclusive carry-propagate condition $$\begin{aligned} G_{i+1}^j &= G_{i+1} & \overline{G_{i+1}^j} &= \overline{P_{i+1}} \\ &+ H_{i+1}^* \cdot G_{i+2} & &+ H_{i+1}^{**} \cdot \overline{P_{i+2}} \\ &\vdots & &\vdots \\ &+ H_{i+1}^* \cdot \ldots \cdot H_{j-1}^* \cdot G_j & &+ H_{i+1}^{} \cdot \ldots \cdot \overline{P_{j-1}} \\ & & &+ H_{i+1}^{} \cdot \ldots \cdot H_{j-1}^{**} \cdot \overline{G_j} \\ H_{i+1}^j &= H_{i+1} \cdot \ldots \cdot H_j & \overline{H_{i+1}^j} &= \overline{H_{i+1}} + \ldots + \overline{H_j} \\ GH_{i+1}^j &= G_{i+1} & \overline{GH_{i+1}^j} &= \overline{P_{i+1}} \\ &+ H_{i-1}^* \cdot G_{i+2} & &+ H_{i+1}^{**} \cdot \overline{P_{i+2}} \\ &\vdots & &\vdots \\ &+ H_{i+1}^* \cdot \ldots \cdot G_{j-1} & &+ H_{i+1}^{} \cdot \ldots \cdot H_{j-1}^{} \cdot \overline{P_j} \\ &+ H_{i+1}^* \cdot \ldots \cdot H_{j-1}^* \cdot P_j & & \end{aligned} \quad (7)$$

$$\therefore S_i = \begin{Bmatrix} \overline{H_i} \cdot G_{i+1} \\ + \overline{H_i} \cdot H_{i+1}^* \cdot G_{i+2} \\ \vdots \\ + \overline{H_i} \cdot H_{i+1}^* \cdot \ldots \cdot H_{j-2}^* \cdot G_{j-1} \\ + \overline{H_i} \cdot H_{i+1}^* \cdot \ldots \cdot H_{j-2}^* \cdot H_{j-1}^* \cdot P_j \\ + H_i \cdot \overline{P_{i+1}} \\ + H_i \cdot H_{i+1}^{} \cdot \overline{P_{i+2}} \\ \vdots \\ + H_i \cdot H_{i+1}^{} \cdot \ldots \cdot H_{j-1}^{**} \cdot \overline{P_j} \end{Bmatrix} \quad (8)$$
$$\vee \{\overline{H_{i+1}} + \ldots + \overline{H_j} + C_{j+1}\}$$

$$\text{and } S_i = \begin{Bmatrix} \overline{H_i} \cdot \overline{P_{i+1}} \\ + \overline{H_i} \cdot H_{i+1}^{} \cdot \overline{P_{i+2}} \\ \vdots \\ + \overline{H_i} \cdot H_{i+1}^{} \cdot \ldots \cdot H_{j-2}^{} \cdot \overline{P_{j-1}} \\ + \overline{H_i} \cdot H_{i+1}^{} \cdot \ldots \cdot H_{j-2}^{**} \cdot H_{j-1}^* \cdot \overline{G_j} \\ + H_i \cdot G_{i+1} \\ + H_i \cdot H_{i+1}^* \cdot G_{i+2} \\ \vdots \\ + H_i \cdot H_{i+1}^* \cdot \ldots \cdot H_{j-1}^* \cdot G_j \end{Bmatrix} \quad (9)$$
$$\vee \{\overline{H_{i+1}} + \ldots + \overline{H_j} + \overline{C_{j+1}}\}$$

Note that the product terms in the bottom half of the upper bracketed expression of equation (9), $H_i \cdot G_{i+1}$, etc. are common with some of the product terms of equation (3). This means that the sum and carry of the same bit position share some product terms. Similarly for equations (8) and (4).

Equations (8) and (9) indicate that an intermediate carry can service a string of several succeeding (next higher-order) sum bits. Furthermore, only one polarity of the intermediate carry is needed. For example, given the positive-polarity intermediate carry, $C_i$, of equation (3), the following three negative-polarity sum bits can be generated according to equation (8) as a function of $C_i$.

$$\overline{S_{i-1}} = \{\overline{H_{i-1}} \not\vdash C_i\} \tag{10}$$

$$\overline{S_{i-2}} = \left(\begin{array}{c} \overline{H_{i-2}} \cdot P_{i-1} \\ +H_{i-2} \cdot \overline{P_{i-1}} \end{array}\right) \not\vdash \{\overline{H_{i-1}} + C_i\} \tag{11}$$

$$\overline{S_{i-3}} = \left(\begin{array}{c} \overline{H_{i-3}} \cdot G_{i-2} \\ +\overline{H_{i-3}} \cdot H^*_{i-2} \cdot P_{i-1} \\ +H_{i-3} \cdot \overline{P_{i-2}} \\ +H_{i-3} \cdot H^{**}_{i-2} \cdot \overline{P_{i-1}} \end{array}\right) \not\vdash \{\overline{H_{i-2}} \cdot P_{i-1} + \overline{H_{i-1}} + C_i\} \tag{12}$$

However, in equation (12) the product term in right bracket $\overline{H_{i-2}}$ can be replaced with an existing product term for equation (11) namely, $\overline{H_{i-2}} \cdot P_{i-1}$. In sums higher than $\overline{S_{i-3}}$ the successive $\overline{H}$ factors namely, $\overline{H_{i-3}}$, $\overline{H_{i-4}}$ and so on are also replaceable by product terms from preceding sums namely, $\overline{H_{i-3}} \cdot H_{i-2}^* \cdot P_{i-1}$, $\overline{H_{i-4}} \cdot H_{i-3} \cdot H_{i-2}^* \cdot P_{i-1}$ and so on. Similarly for a positive string of sums $\overline{H_{i-2}}$ could be replaced by an existing product term $\overline{H_{i-2}} \cdot G_{i-1}$, $\overline{H_{i-3}}$ could be replaced by $\overline{H_{i-3}} \cdot H_{i-2}^{**} \cdot G_{i-1}$, etc. Note that the first sum $\overline{S_{i-1}}$ needs only one additional product term, $\overline{H_{i-1}}$. The second sum needs two additional product terms, $\overline{H_{i-2}} \cdot P_{i-1}$ and $H_{i-2} \cdot \overline{P_{i-1}}$. Because the negative polarity $\overline{S_{i-1}}$ was selected, the term $\overline{H_{i-1}}$ is shared between $\overline{S_{i-1}}$ and $\overline{S_{i-2}}$. The third sum needs four additional product terms, four in the left bracket. A fourth sum would take six additional product terms, the next one eight, then ten, etc. The total number of additional product terms needed by a string of K sum bits is:

$$1 + 2 + 4 + 6 + \ldots + 2(K-1) = K^2 - K + 1 \tag{13}$$

To this number we add the additional product terms needed by the carry out of the high-order sum bit of the string, noting that this carry, $\overline{C_{i-k}}$, shares some of the product terms of the high-order sum of the string. The number of additional product terms needed by $\overline{C_{i-k}}$ is:

$$(L + K + 1) - (K - 1) = L + 2 \tag{14}$$

where L = the number of low-order bit positions up to but not including the present string
(L + K + 1) = the total number of product terms needed for $\overline{C_{i-k}}$.
(K − 1) = the number of product terms $\overline{C_{i-k}}$ shares with $\overline{S_{i-k}}$.

The total number of additional product terms, T, needed by the string of sums and its output carry is the sum of equations (13) and (14):

$$T = K^2 - K + 1 + (L + 2) = K^2 - K + 3 + L \tag{15}$$

Normalizing to the size of the string, K, we get:

$$T/K = \frac{K^2 - K + 3 + L}{K} \tag{16}$$

The breakeven point for going to the next longer string occurs when T/K is equal for both K as well as (K+1). Therefore, $$T/K = T/K + 1 = \frac{K^2 - K + 3 + L}{K} =$$

$$\frac{(K+1)^2 - (K+1) + 3 + L}{K+1}$$

so that $$\frac{3+L}{K} = \frac{(K+1) + 3 + L}{K+1}$$

and $$L = K^2 + K - 3 \tag{17}$$

The transition points at which it pays to go to the next larger string is given by equation (17) and listed in the following table:

| $K \to (K+1)$ | $2 \to 3$ | $3 \to 4$ | $4 \to 5$ | $5 \to 6$ | ... |
|---|---|---|---|---|---|
| L | 3 | 9 | 17 | 27 | |

In other words, after three low-order bit positions, the next string is equally efficient at 2 or 3. After nine bit positions, the next string size is equally efficient at 3 or 4, etc.

The span of bit positions covered by adjacent strings of the same size is:

$$L \left[\begin{array}{c} \text{at optimum transition} \\ \text{from } (K+1) \text{ to } (K+2) \end{array}\right] - L \left[\begin{array}{c} \text{at optimum transition} \\ \text{from } K \text{ to } (K+1) \end{array}\right] \tag{18}$$

$$= (K+1)^2 + (K+1) - 3 - (K^2 + K - 3)$$
$$= 2(K+1)$$

In other words, when we determine after L bit positions that the next string size can be increased from K to K+1, we can assign two such strings in sequence before a string of K+2 can be justified. The exception is the low-order string of 1 which will be described later. The optimal string assignment is therefore: 1 string of 1, 1 string of 2, followed by pairs of strings of next integer values (2 strings of 3, 2 strings of 4, etc.)

Note that the negative-polarity carry $\overline{C_{i-k}}$ shares product terms with the high-order sum bit of string $\overline{S_{i-k}}$. Similarly the positive-polarity $C_{i-k}$ would share product terms with the high-order sum bit of the positive-polarity string $S_{i-k}$. Opposite polarities do not share product terms. As a result, successive strings are of opposite polarity, noting that the negative-polarity sum bits are functions of a positive-polarity carry, and vice versa.

A further reduction in product terms is achieved with the high-order string. Here, the output carry of the string is $C_{out}$, the output carry of the adder, which is expressed as an X-OR of two functions, using the highest-order intermediate carry already available, $C_{j+1}$.

$$\overline{C_{out}} = G_0^j + H_0^j \cdot C_{j+1} = G_0^j \not\vdash H_0^j \cdot C_{j+1} = \tag{19}$$

$$\{G_0^j\} \not\vdash \{\overline{H_0^j} + \overline{C_{j+1}}\}$$

$$\therefore \overline{C_{out}} = \left(\begin{array}{c} G_0 \\ +H_0 \cdot G_1 \\ \cdot \\ \cdot \\ +H_0 \cdot H_1^* \cdot \ldots \cdot H_{j-1}^* \cdot G_j \end{array}\right) \tag{20}$$

-continued $$\nleftarrow \{\overline{H}_0 + \ldots + \overline{H}_j + C_{j+1}\}$$

For a positive-polarity high-order string, we get:

$$C_{out} = \begin{Bmatrix} \overline{P}_0 \\ +H_0 \cdot \overline{P}_1 \\ \cdot \\ \cdot \\ +H_0 \cdot H_1^{} \cdot \ldots \cdot H_{j-1}^{} \cdot \overline{P}_j \end{Bmatrix} \quad (21)$$

$$V\{\overline{H}_0 + \ldots + \overline{H}_j + C_{j+1}\}$$

Note that only one additional product term is needed for $\overline{C}_{out}$ (i.e., $G_0$) or for $C_{out}$ (i.e., $\overline{P}_0$). The remaining product terms are shared with those of $S_0$ or $\overline{S}_0$, respectively. Again, the $\overline{H}_0$, $\overline{H}_1$, etc. of the second bracket can be replaced by product terms already available in the sums of the string as described previously. Therefore, the total number of additional product terms needed for the high-order string of K is:

$$T_{high} = K^2 - K + 2 \quad (22)$$

A special low-order string of one in the low-order bit, using three product terms, $H_{low} \cdot \overline{C}_{in}$, $\overline{H}_{low} \cdot C_{in}$, and $\overline{P}_{low}$, are generated as follows:

$$S_{low} = \{H_{low} \cdot \overline{C}_{in}\} V\{\overline{H}_{low} \cdot C_{in}\} \quad (23)$$

$$\overline{C}_{low} = \overline{P}_{low} \nleftarrow \{\overline{H}_{low} \cdot \overline{C}_{in}\} \quad (24)$$

Alternatively, the complements may be used:

$$\overline{S}_{low} = \{H_{low} \cdot C_{in}\} \nleftarrow \{\overline{H}_{low} \cdot \overline{C}_{in}\} \quad (25)$$

$$C_{low} = G_{low} \nleftarrow \{H_{low} \cdot C_{in}\} \quad (26)$$

For a low-order string of 2 or greater, the number of unique product terms includes the product term $\overline{C}_{in}$ (or $C_{in}$) plus the unique product terms normally required of a positive (negative) string of sums and its output carry.

The optimum low-order string size is one or two. This leads to the following empirical procedure for assigning string sizes: We begin with a low-order string of one (the smaller of the two optimal sizes), followed by a single string of two and pairs of strings of three, four, etc. If the bit positions of the adder are exhausted when the high-order string is equal to or one greater than the adjacent string, the first-pass string assignment is final. If the high-order string is less than the adjacent string, the latter becomes the new high-order string and the former high-order string is deemed a remainder to be absorbed by the intermediate strings as follows: First, the low-order string of 1 is increased to 2, the next string of 2 is increased to 3, the higher-order of the two strings of 3 is increased to 4, the higher-order of the next pair of intermediate strings is increased by one, etc., until the remainder is exhausted.

The following table illustrates the procedure for assigning optimum strings. The assignment is not necessarily unique. For some adder sizes other optima are possible. For example, the 8-bit adder of FIG. 7 can also be implemented with 25 product terms using string sizes 2, 3, 2, and 1, high-to-low order.

| First-pass String Assignment (Nos. are string sizes) | | | | | | | | Final String Assignment |
|---|---|---|---|---|---|---|---|---|
|   |   | 5 | 4 | 4 | 3 | 3 | 2 | 1 ⎫ |
|   | 5 | 5 | 4 | 4 | 3 | 3 | 2 | 1 ⎬ no change |
| 5 | 5 | 5 | 4 | 4 | 3 | 3 | 2 | 1 ⎭ |
|   |   |   |   |   |   | + |   |   |
|   | ɫ | 5 | 4 | 4 | 3 | 3 | 2 | 1   5 4 4 3 3 2 2 |
|   |   |   |   |   |   | + | + |   |
|   | ɫ | 5 | 4 | 4 | 3 | 3 | 2 | 1   5 4 4 3 3 3 2 |
|   |   |   |   |   | + | + | + |   |
|   | ɫ | 5 | 4 | 4 | 3 | 3 | 2 | 1   5 4 4 4 3 3 2 |
|   |   |   |   | + | + | + | + |   |
|   | ɫ | 5 | 4 | 4 | 3 | 3 | 2 | 1   5 5 4 4 3 3 2 |

+ above numbers marks strings to be increased by one.
ɫ through numbers marks remainder to be absorbed.

FIG. 4 illustrates the arrangement of strings and the product terms needed for 8, 16 and 32 bit adders.

Above is described a preferred embodiment of the invention. A number of modifications can be made in this embodiment without departing from the scope of the invention. For instance when the carry out is expanded in terms of a distant carry using the carry lookahead method such as in equation (3) the H's used in expanding may be replaced by P's. Similarly when the complement of the carry, $\overline{C}$, is so expanded as in equation (4) the H's may be replaced by $\overline{G}$'s. These same rules hold for the carry expansion for the sum bits, S, in equations (8) and (9). This is because $$G_i + H_i \cdot G_{i+1} = G_i + P_i \cdot G_{i+1}$$

and $$\overline{P}_i + H_i \cdot \overline{P}_{i+1} = \overline{P}_i + \overline{G}_i \cdot \overline{P}_{i+1}$$

In making such substitutions attention must be paid to the sharing of product terms and for this reason not all suitable H's are replaced in the equations. In equations (3) and (4) some of the high order H's would not be replaced to permit their sharing in the corresponding sum bit. Of course, in equations (8) and (9) the left-most H's in the product terms of sum bits can not be replaced because of lack of equivalence.

Further reduction in the number of product terms for an adder is obtained using 4-input or higher-input decoders while preserving the generality of the use of the PLA. A product term is not defined as the AND of functions of input groups, an input group comprising the inputs of a decoder. Using standard decoders, however results in a wider AND array and more costly decoding. For example, a 4-input decoder replacing two 2-input decoders doubles the number of decoder outputs from 8 to 16, an 8-input decoder replacing four 2-input decoders increases the number of decoder outputs from 16 to 256, etc. In the limit, a single decoder accepting all adder inputs becomes a conventional memory decoder, while each product term can represent any function of the decoder inputs without the need of an OR array. In short, the single decoder with the AND array comprise a complete ROM (read-only memory) whose outputs are any desired logic functions of the inputs.

Special decoders, however, permit more inputs per decoder without expanding the width of the AND array or at most only moderately expanding it. One type of special decoder produces elementary symmetric functions to take advantage of symmetry such as exists between the pair of adder inputs of a typical adder bit position. The decoder generates the unique values of the combined weights of its inputs. For example, two pairs of adder inputs of adjacent bit positions have relative weights of 2, 2, 1, and 1. They enter the special decoder which generates 7 elementary symmetric functions representing the combined input values ranging from 0 to 6. Any adder function of the 4 inputs can be generated from a combination of the 7 decoder outputs.

FIG. 5 compares 2-input and 4-input special decoders showing the generated outputs. It is noted that replacing a pair of 2-input special decoders with one 4-input special decoder increases the number of decoder outputs from 6 to 7. By contrast, with conventional decoders, the number of outputs doubles—from 8 to 16.

The width of the AND arry can be further reduced by customizing each decoder to produce only those functions that the product terms require, particularly for decoders with a large number of inputs. For example, an 8-input special decoder which accepts four adjacent pairs of adder inputs of relative weights 8, 8, 4, 4, 2, 2, 1, and 1, produces 31 elementary symmetric functions representing weights 0 through 30. However, the number of different functions of these inputs actually needed by the product terms of a 32-bit adder varies from 6 to 10. In other words, the width of the AND array is actually less for 8-input custom decoders than for decoders with fewer inputs. At the same time, the number of product terms is also reduced. The price for reducing the AND array in both dimensions is a set of more complex functions produced by the custom decoders.

A custom decoder is particularly useful for the low-order inputs with which the input carry may be combined into one decoder.

Figure 6A:
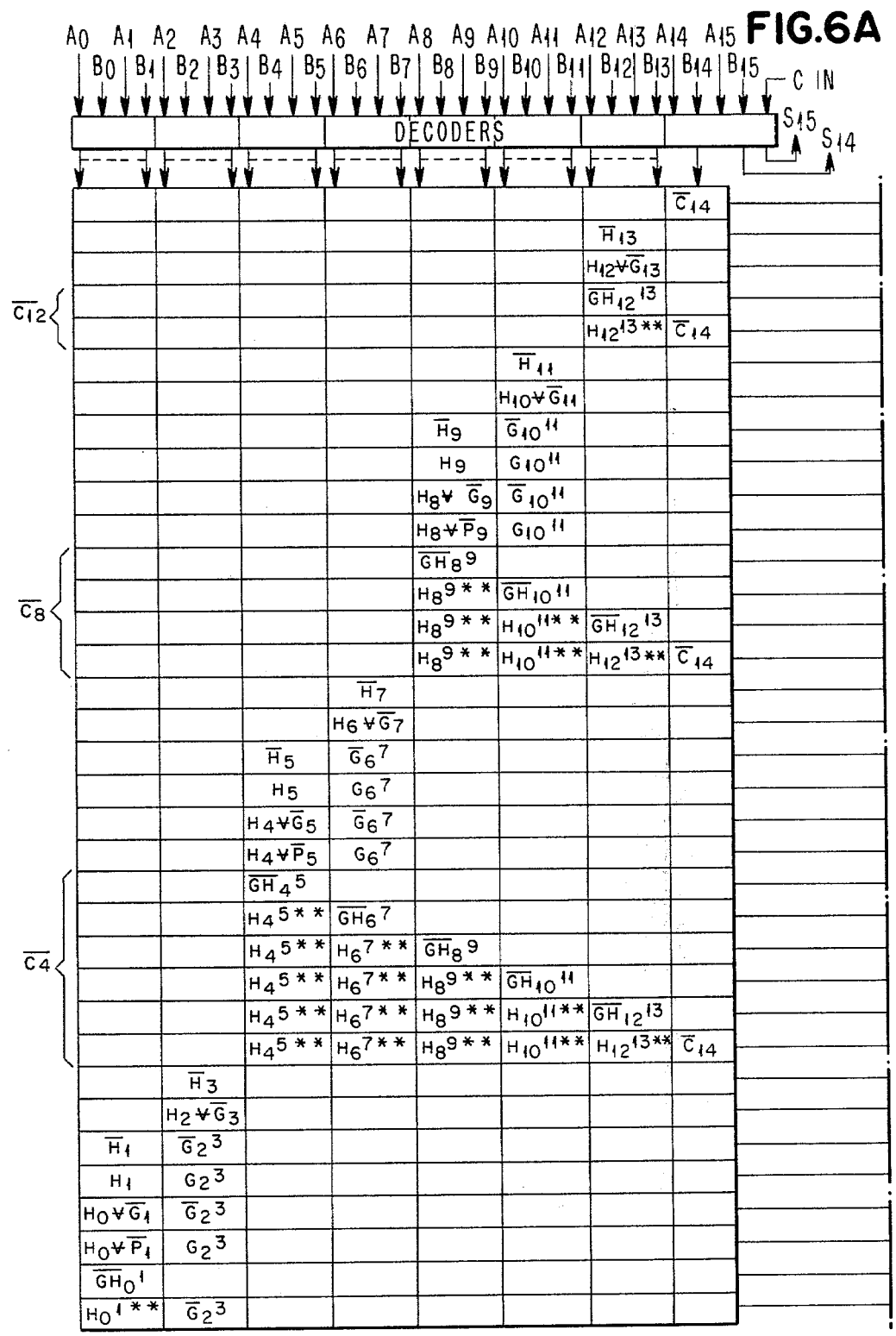
FIGS. 6A and 6B are diagrams of an adder arranged in accordance with the present invention where four and five bit decoders are used to accept the input terms.
Figure 6B:
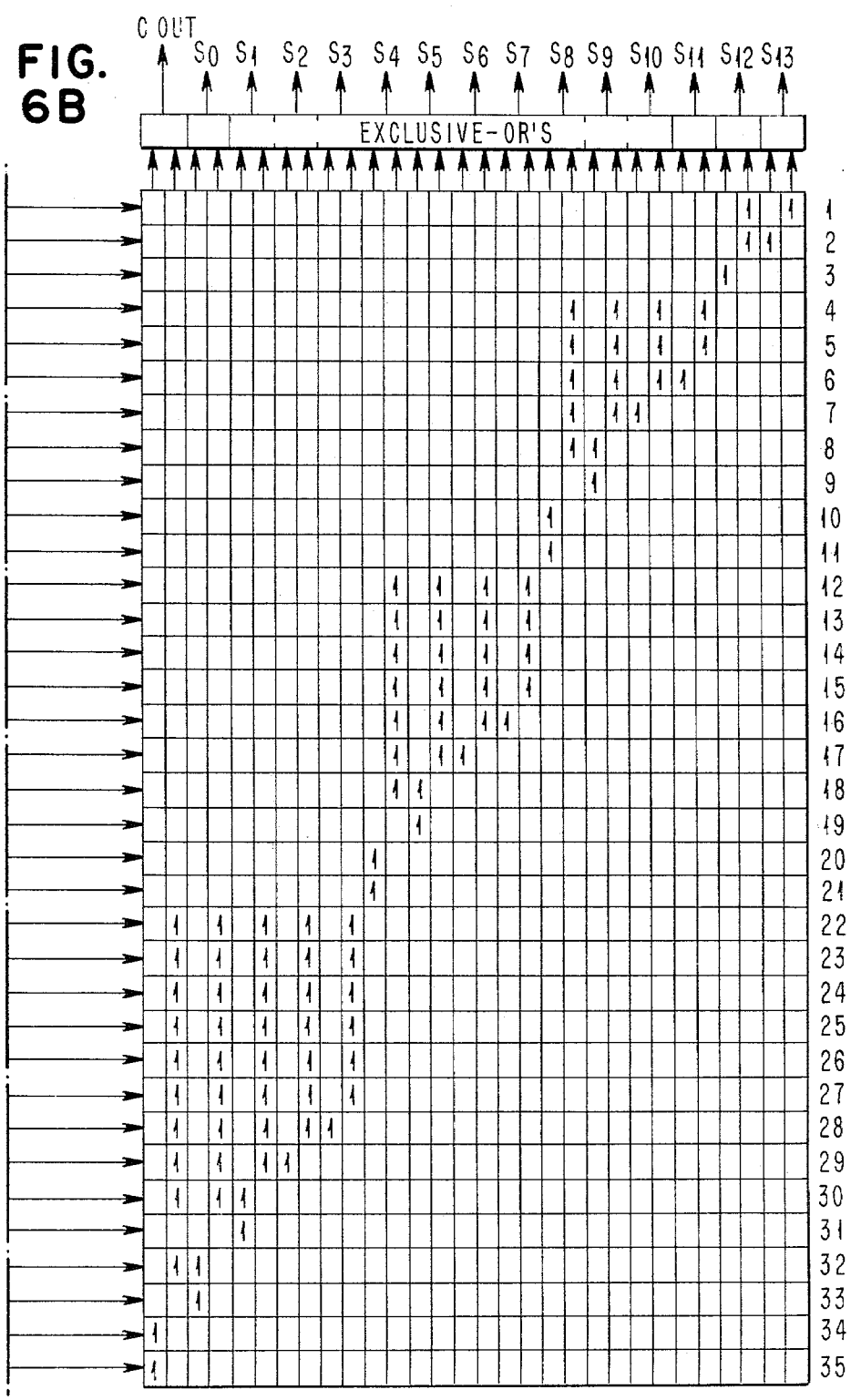

A 16-bit adder, shown in FIG. 6 will be used to demonstrate the effect of using 4- and 5-input decoders for adder designs. The equations defining this adder are as follows.

$$S_{15} = (H_{15} \not\vdash C_{in})$$

$$S_{14} = (H_{14} \not\vdash (G_{15} + P_{15} \cdot C_{in}))$$

$$\overline{C}_{14} = \begin{pmatrix} \overline{P}_{14} \\ +\overline{G}_{14} \cdot \overline{P}_{15} \\ +\overline{G}_{14} \cdot \overline{G}_{15} \cdot \overline{C}_{in} \end{pmatrix}$$

$$S_{13} = \{(\overline{H}_{13})\} \not\vdash \{\overline{C}_{14}\}$$

$$S_{12} = \{(H_{12} \not\vdash \overline{G}_{13})\} \not\vdash \{(\overline{H}_{13}) + \overline{C}_{14}\}$$

$$\overline{C}_{12} = (\overline{GH}_{12}^{13})$$
$$\quad + (H_{12}^{13**}) \cdot (\overline{C}_{14})$$

$$S_{11} = \{(\overline{H}_{11})\} \not\vdash \{\overline{C}_{12}\}$$

$$S_{10} = \{(H_{10} \not\vdash \overline{G}_{11})\} \not\vdash \{(\overline{H}_{11}) + \overline{C}_{12}\}$$

$$S_9 = \left\{ \begin{array}{l} (\overline{H}_9) \cdot (\overline{G}_{10}^{11}) \\ +(H_9) \cdot (G_{10}^{11}) \end{array} \right\} \not\vdash \left\{ \begin{array}{l} (H_{10} \not\vdash \overline{G}_{11}) \\ +(\overline{H}_{11}) + \overline{C}_{12} \end{array} \right\}$$

$$S_8 = \left\{ \begin{array}{l} (H_8 \not\vdash \overline{G}_9) \cdot (\overline{G}_{10}^{11}) \\ +(H_8 \not\vdash \overline{P}_9) \cdot (G_{10}^{11}) \end{array} \right\} \not\vdash \left\{ \begin{array}{l} (\overline{H}_9) \cdot (\overline{G}_{10}^{11}) + (H_{10} \not\vdash \overline{G}_{11}) \\ +(\overline{H}_{11}) + \overline{C}_{12} \end{array} \right\}$$

$$\overline{C}_8 = (\overline{GH}_8^9)$$
$$\quad + (H_8^{9**}) \cdot (\overline{GH}_{10}^{11})$$
$$\quad + (H_8^{9}) \cdot (H_{10}^{11}) \cdot (\overline{GH}_{12}^{13})$$
$$\quad + (H_8^{9}) \cdot (H_{10}^{11}) \cdot (H_{12}^{13**}) \cdot (\overline{C}_{14})$$

$$S_7 = \{(\overline{H}_7)\} \not\vdash \{\overline{C}_8\}$$

$$S_6 = \{(H_6 \not\vdash \overline{G}_7)\} \not\vdash \{(\overline{H}_7) + \overline{C}_8\}$$

$$S_5 = \left\{ \begin{array}{l} (\overline{H}_5) \cdot (\overline{G}_6^7) \\ +(H_5) \cdot (G_6^7) \end{array} \right\} \not\vdash \left\{ \begin{array}{l} (H_6 \not\vdash \overline{G}_7) \\ +(\overline{H}_7) + \overline{C}_8 \end{array} \right\}$$

$$S_4 = \left\{ \begin{array}{l} (H_4 \not\vdash \overline{G}_5) \cdot (\overline{G}_6^7) \\ +(H_4 \not\vdash \overline{P}_5) \cdot (G_6^7) \end{array} \right\} \not\vdash \left\{ \begin{array}{l} (\overline{H}_5) \cdot (\overline{G}_6^7) + (H_6 \not\vdash \overline{G}_7) \\ +(\overline{H}_7) + \overline{C}_8 \end{array} \right\}$$

$$\overline{C}_4 = (\overline{GH}_4^5)$$
$$\quad + (H_4^{5**}) \cdot (\overline{GH}_6^7)$$
$$\quad \cdot$$
$$\quad + (H_6^{5**}) \cdot \ldots \cdot (\overline{GH}_{12}^{13})$$
$$\quad + (H_4^{5}) \cdot \ldots \cdot (H_{12}^{13}) \cdot (\overline{C}_{14})$$

$$S_3 = \{(\overline{H}_3)\} \not\vdash \{\overline{C}_4\}$$

$$S_2 = \{(H_2 \not\vdash \overline{G}_3)\} \not\vdash \{(\overline{H}_3) + \overline{C}_4\}$$

$$S_1 = \left\{ \begin{array}{l} (\overline{H}_1) \cdot (\overline{G}_2^3) \\ +(H_1) \cdot (G_2^3) \end{array} \right\} \not\vdash \left\{ \begin{array}{l} (H_2 \not\vdash \overline{G}_3) \\ +(\overline{H}_3) + \overline{C}_4 \end{array} \right\}$$

$$S_0 = \left\{ \begin{array}{l} (H_0 \not\vdash \overline{G}_1) \cdot (\overline{G}_2^3) \\ +(H_0 \not\vdash \overline{P}_1) \cdot (G_2^3) \end{array} \right\} \not\vdash \left\{ \begin{array}{l} (\overline{H}_1) \cdot (\overline{G}_2^3) + (H_2 \not\vdash \overline{G}_3) \\ +(\overline{H}_3) + \overline{C}_4 \end{array} \right\}$$

$$C_{out} = \left\{ \begin{array}{l} (\overline{GH}_0^1) \\ +(H_0^{1**}) \cdot (\overline{G}_2^3) \end{array} \right\} \not\vdash \left\{ \begin{array}{l} (H_0 \not\vdash \overline{G}_1) \cdot (\overline{G}_2^3) \\ +(\overline{H}_1) \cdot (\overline{G}_2^3) + (H_2 \not\vdash \overline{G}_3) \\ +(\overline{H}_3) + \overline{C}_4 \end{array} \right\}$$

A 5-input custom decoder is used for the inputs comprising the input carry, $C_{in}$, and the two pairs of inputs to the low-order bit positions 14 and 15. The remaining decoders accept 4 inputs each, comprising pairs of inputs of adjacent bit positions.

Adder outputs are again grouped in strings of adjacent sum bits. The low-order string includes the two positive low-order sum bits. They exit directly from the custom 5-input decoder. A negative output carry from the string is also generated from the 5-input decoder as a single product term to help generate the next positive string of sum bits. Equations (27a), (27b), and (27c) express positive low-order string outputs for an n-bit adder.

$$S_{n-1} = H_{n-1} \not\vdash C_{in} \tag{27a}$$

$$S_{n-2} = H_{n-2} \not\vdash (G_{n-1} + P_{n-1} \cdot C_{in}) \tag{27b}$$

$$\overline{C}_{n-2} = \overline{P}_{n-2} + \overline{G}_{n-2} \cdot \overline{P}_{n-1} + \overline{G}_{n-2} \cdot \overline{G}_{n-1} \cdot \overline{C}_{in} \tag{27c}$$

while equations (28a), (28b), and (28c) express negative low-order string outputs.

$$\overline{S}_{n-1} = H_{n-1} \not\vdash C_{in} \tag{28a}$$

$$\overline{S}_{n-2} = H_{n-2} \not\vdash (\overline{P}_{n-1} + \overline{G}_{n-} \cdot \overline{C}_{in}) \tag{28b}$$

$$C_{n-2} = G_{n-2} + P_{n-2} \cdot G_{n-1} + P_{n-2} \cdot P_{n-1} \cdot C_{in} \tag{28c}$$

A positive intermediate string is generated according to equation (29) and a negative string according to equation (30).

$$S_j = \{(\overline{H}_j)\} \not\vdash \{\overline{C}_{j+1}\}$$

$$S_{j-1} = \{(H_{j-1} \not\vdash \overline{G}_j)\} \not\vdash \{(\overline{H}_j) + \overline{C}_{j+1}\}$$

$$S_{j-2} = \left\{ \begin{array}{l} (\overline{H}_{j-2}) \cdot (\overline{G}_{j-1}^j) \\ +(H_{j-2}) \cdot (G_{j-1}^j) \end{array} \right\} \not\vdash \left\{ \begin{array}{l} (H_{j-1} \not\vdash \overline{G}_j) \\ +(\overline{H}_j) + \overline{C}_{j+1} \end{array} \right.$$

$$S_{j-3} = \left\{ \begin{array}{l} (H_{j-3} \not\vdash \overline{G}_{j-2}) \cdot (\overline{G}_{j-1}^j) \\ +(H_{j-3} \not\vdash \overline{P}_{j-2}) \cdot (G_{j-1}^j) \end{array} \right\} \not\vdash \left\{ \begin{array}{l} (\overline{H}_{j-2}) \cdot (\overline{G}_{j-1}^j) + (H_{j-1} \not\vdash \overline{G}_j) \\ +(\overline{H}_j) + \overline{C}_{j+1} \end{array} \right\}$$

$$S_{j-4} = \left\{ \begin{array}{l} (\overline{H}_{j-4}) \cdot (\overline{GH}_{j-3}^{j-2}) \\ +(\overline{H}_{j-4}) \cdot (H_{j-3}^{j-2**}) \cdot (\overline{G}_{j-1}^j) \\ +(\overline{H}_{j-4}) \cdot (G_{j-3}^{j-2}) \\ +(\overline{H}_{j-4}) \cdot (H_{j-3}^{j-2*}) \cdot (G_{j-1}^j) \end{array} \right\}$$

$$\not\vdash$$

$$\left\{ \begin{array}{l} (H_{j-3} \not\vdash \overline{G}_{j-2}) \cdot (\overline{G}_{j-1}^j) \\ +(\overline{H}_{j-2}) \cdot (\overline{G}_{j-1}^j) + (H_{j-1} \not\vdash \overline{G}_j) \\ +(\overline{H}_j) + \overline{C}_{j+1} \end{array} \right\}$$

$$\vdots$$

$$S_i = \left[ \begin{array}{l} (H_i \not\vdash \overline{G}_{i+1}) \cdot (\overline{GH}_{i+2}^{i+3}) \\ +(H_i \not\vdash \overline{G}_{i+1}) \cdot (H_{i+2}^{i+3**}) \cdot (\overline{GH}_{i+4}^{i+5}) \\ \vdots \end{array} \right] \quad (29)$$

$$\left\{ \begin{array}{l} +(H_i \not\vdash \overline{G}_{i+1}) \cdot (H_{i+2}^{i+3}) \cdot \ldots \cdot (\overline{GH}_{j-3}^{j-2}) \\ +(H_i \not\vdash \overline{G}_{i+1}) \cdot (H_{i+2}^{i+3}) \cdot \ldots \cdot (H_{j-3}^{j-2**}) \cdot (\overline{G}_{j-1}^j) \\ +(H_i \not\vdash \overline{P}_{i+1}) \cdot (G_{i+2}^{i+3}) \\ +(H_i \not\vdash \overline{P}_{i+1}) \cdot (H_{i+2}^{i+3*}) \cdot (G_{i+4}^{i+5}) \\ \vdots \\ +(H_i \not\vdash \overline{P}_{i+1}) \cdot (H_{i+2}^{i+3*}) \cdot \ldots \cdot (H_{j-3}^{j-2*}) \cdot (G_{j-1}^j) \end{array} \right\}$$

$$\not\vdash$$

$$\left\{ \begin{array}{l} (\overline{H}_{i+1}) \cdot (H_{i+2}^{i+3}) \cdot \ldots \cdot (H_{j-3}^{j-2}) \cdot (\overline{G}_{j-1}^j) \\ +(H_{i+2} \not\vdash \overline{G}_{i+3}) \cdot (H_{i+4}^{i+5}) \cdot \ldots \cdot (H_{j-3}^{j-2}) \cdot (\overline{G}_{j-1}^j) \\ \vdots \\ +(\overline{H}_{j-4}) \cdot (H_{j-3}^{j-2**}) \cdot (\overline{G}_{j-1}^j) \\ +(H_{j-3} \not\vdash \overline{G}_{j-2}) \cdot (\overline{G}_{j-1}^j) \\ +(\overline{H}_{j-2}) \cdot (\overline{G}_{j-1}^j) + (H_{j-1} \not\vdash \overline{G}_j) \\ +(\overline{H}_j) + \overline{C}_{j+1} \end{array} \right\}$$

$$\overline{S}_j = \{(\overline{H}_j)\} \not\vdash \{C_{j+1}\}$$

$$\overline{S}_{j-1} = \{(H_{j-1} \not\vee P_j) \not\vee \{(\overline{H}_j) + C_{j+1}\}$$

$$\overline{S}_{j-2} = \left\{ \begin{array}{l} (\overline{H}_{j-2}) \cdot (GH^j_{j-1}) \\ +(H_{j-2}) \cdot (\overline{GH}^j_{j-1}) \end{array} \right\} \not\vee \left\{ \begin{array}{l} (H_{j-1} \not\vee P_j) \\ +(\overline{H}_j) + C_{j+1} \end{array} \right\}$$

$$\overline{S}_{j-3} = \left\{ \begin{array}{l} (H_{j-3} \not\vee P_{j-2}) \cdot (GH^j_{j-1}) \\ +(H_{j-3} \not\vee G_{j-2}) \cdot (\overline{GH}^j_{j-1}) \end{array} \right\} \not\vee \left\{ \begin{array}{l} (\overline{H}_{j-2}) \cdot (GH^j_{j-1}) + (H_{j-1} \not\vee P_j) \\ +(\overline{H}_j) + C_{j+1} \end{array} \right\}$$

$$\overline{S}_{j-4} = \left\{ \begin{array}{l} (\overline{H}_{j-4}) \cdot (G^{j-2}_{j-3}) \\ +(\overline{H}_{j-4}) \cdot (H^{j-2}_{j-3}*) \cdot (GH^j_{j-1}) \\ +(H_{j-4}) \cdot (\overline{GH}^{j-2}_{j-3}) \\ +(H_{j-4}) \cdot (H^{j-2}_{j-3}**) \cdot (\overline{GH}^j_{j-1}) \end{array} \right\}$$

$$\not\vee \left\{ \begin{array}{l} (H_{j-3} \not\vee P_{j-2}) \cdot (GH^j_{j-1}) \\ +(\overline{H}_{j-2}) \cdot (GH^j_{j-1}) + (H_{j-1} \not\vee P_j) \\ +(\overline{H}_j) + C_{j+1} \end{array} \right\}$$

$$\overline{S}_i = \left[ \begin{array}{l} (H_i \not\vee P_{i+1}) \cdot (G^{i+3}_{i+2}) \\ +(H_i \not\vee P_{i+1}) \cdot (H^{i+3}_{i+2}*) \cdot (G^{i+5}_{i+4}) \\ \vdots \\ +(H_i V P_{i+1}) \cdot (H^{i+3}_{i+2}*) \cdot \ldots \cdot (G^{j-2}_{j-3}) \\ +(H_i \not\vee P_{i+1}) \cdot (H^{i+3}_{i+2}*) \cdot \ldots \cdot (H^{j-2}_{j-3}*) \cdot (GH^j_{j-1}) \\ +(H_i \not\vee G_{i+1}) \cdot (\overline{GH}^{i+3}_{i+2}) \\ +(H_i \not\vee G_{i+1}) \cdot (H^{i+3}_{i+2}) \cdot (\overline{GH}^{i+5}_{i+4}) \\ \vdots \\ +(H_i \not\vee G_{i+1}) \cdot (H^{i+3}_{i+2}) \cdot \ldots \cdot (H^{j-2}_{j-3}**) \cdot (\overline{GH}^j_{j-1}) \end{array} \right] \quad (30)$$

$$\not\vee \left\{ \begin{array}{l} (\overline{H}_{i+1}) \cdot (H^{i+3}_{i+2}*) \cdot \ldots \cdot (H^{j-2}_{j-3}) \cdot (GH^j_{j-1}) \\ +(H_{i+2} V P_{i+3}) \cdot (H^{i+5}_{i+4}*) \cdot \ldots \cdot (H^{j-2}_{j-3}*) \cdot (GH^j_{j-1}) \\ \vdots \\ +(\overline{H}_{j-4}) \cdot (H^{j-2}_{j-3}*) \cdot (GH^j_{j-1}) \\ +(H_{j-3} \not\vee P_{j-2}) \cdot (GH^j_{j-1}) \\ +(\overline{H}_{j-2}) \cdot (GH^j_{j-1}) + (H_{j-1} \not\vee P_j) \\ +(\overline{H}_j) + C_{j+1} \end{array} \right\}$$

(A single asterisk attached to the strict propagate function, $H_a{}^{a+1*}$, means that $G_a{}^{a+1}$ may be used as don't-care conditions to simplify $H_a{}^{a+1}$, e.g., $GH_a{}^{a+1}$ may be substituted for $H_a{}^{a+1}$. Similarly, a double asterisk, $H_a{}^{a+1**}$, means $GH_a{}^{a+1}$ may be used as don't-care conditions, e.g., $G_a{}^{a+1}$ may be substituted. The principle has already been applied to single-bit propagate functions where P or G were substituted for H, and is also extendable to multi-bit propagate functions.) The sum equations follow from equations (3) and (4) applied to 4-input decoders. The expression $H_i{}^j$ normally represented by the sum of product terms $H_i + \cdots + H_j$ is actually represented by an equivalent sum of product terms already available in the left brackets of the sum bits.

The output carry of the string, equations (31) and (32) is of opposite polarity to the sums, so that the succeeding string of sums would continue the polarity of the present string of sums. Positive strings of sums are arbitrarily selected for the 16-bit adder of FIG. 6.

$$C_i = G_i^{i+1} \qquad (31)$$
$$+ H_i^{i+1*} \cdot G_{i+2}^{i+3}$$
$$\vdots$$
$$+ H_i^{i+1*} \cdot \ldots \cdot G_{n-2}^{n-1}$$

-continued
$$+ H_i^{j+1*} \cdots H_{n-2}^{n-1*} \cdot C_{in}$$

$$\overline{C_i} = \overline{GH_i^{j+1}} \tag{32}$$

$$+ H_i^{j+1**} \cdot \overline{GH_{i+2}^{j+3}}$$

$$\vdots$$

$$+ H_i^{j+1**} \cdots \overline{GH_{n-2}^{n-1}}$$

$$+ H_i^{j+1} \cdots H_{n-2}^{n-1} \cdot \overline{C_{in}}$$

When the string size exceeds 4, an alternative equation for the high-order sum bit of the intermediate string may be used, as in equations (33) and (34).

$$S_i = \left\{ \begin{array}{l} (\overline{H_i} \cdot \overline{P_{i+1}} + H_i \cdot G_{i+1}) \\ + (\overline{H_i} \cdot H_{i+1}^{}) \cdot (\overline{GH_{i+2}^{i+3}}) \\ + (\overline{H_i} \cdot H_{i+1}^{}) \cdot (H_{i+2}^{i+3*}) \cdot (\overline{GH_{i+4}^{i+5}}) \\ \vdots \\ + (\overline{H_i} \cdot H_{i+1}^{**}) \cdot (H_{i+2}^{i+3*}) \cdots (\overline{GH_{j-3}^{j-2}}) \\ + (\overline{H_i} \cdot H_{i+1}^{**}) \cdot (H_{i+2}^{i+3*}) \cdots (H_{j-3}^{j-2**}) \cdot (\overline{G_{j-1}^{j}}) \\ + (H_i \cdot H_{i+1}^{*}) \cdot (G_{i+2}^{i+3}) \\ + (H_i \cdot H_{i+1}^{*}) \cdot (H_{i+2}^{i+3*}) \cdot (G_{i+4}^{i+5}) \\ \vdots \\ + (H_i \cdot H_{i+1}^{*}) \cdot (H_{i+2}^{i+3*}) \cdots (G_{j-1}^{j}) \end{array} \right\} \tag{33}$$

$$\not V$$

$$\left\{ \begin{array}{l} (\overline{H_{i+1}}) \cdot (H_{i+2}^{i+3}) \cdots (H_{j-3}^{j-2}) \cdot (\overline{G_{j-1}^{j}}) \\ + (H_{i+2} \not V \overline{G_{i+3}}) \cdot (H_{i+4}^{i+5}) \cdots (H_{j-3}^{j-2}) \cdot (\overline{G_{j-1}^{j}}) \\ \vdots \\ + (\overline{H_{j-4}}) \cdot (H_{j-3}^{j-2**}) \cdot (\overline{G_{j-1}^{j}}) \\ + (H_{j-3} \not V \overline{G_{j-2}}) \cdot (\overline{G_{j-1}^{j}}) \\ + (\overline{H_{j-2}}) \cdot (\overline{G_{j-1}^{j}}) + (H_{j-1} \vee \overline{G_j}) \\ + (\overline{H_j}) + \overline{C_{j+1}} \end{array} \right\}$$

$$\overline{S_i} = \left\{ \begin{array}{l} (\overline{H_i} \cdot G_{i+1} + H_i \cdot \overline{P_{i+1}}) \\ + (\overline{H_i} \cdot H_{i+1}^{*}) \cdot (G_{i+2}^{i+3}) \\ + (\overline{H_i} \cdot H_{i+1}^{*}) \cdot (H_{i+2}^{i+3*}) \cdot (G_{i+4}^{i+5}) \\ \vdots \\ + (\overline{H_i} \cdot H_{i+1}^{*}) \cdot (H_{i+2}^{i+3*}) \cdots (G_{j-3}^{j-2}) \\ + (\overline{H_i} \cdot H_{i+1}^{*}) \cdot H_{i+2}^{i+3*}) \cdots (H_{j-3}^{j-2*}) \cdot (GH_{j-1}^{j}) \\ + (H_i \cdot H_{i+1}^{}) \cdot (\overline{GH_{i+2}^{i+3}}) \\ + (H_i \cdot H_{i+1}^{}) \cdot (H_{i+2}^{i+3**}) \cdot (\overline{GH_{i+4}^{i+5}}) \\ \vdots \end{array} \right\} \tag{34}$$

$$+ (H_i \cdot H_{i+1}^{}) \cdot (H_{i+2}^{i+3}) \cdots (\overline{GH_{j-1}^{j}})$$

$$\not V$$

$$\left\{ \begin{array}{l} (\overline{H_{i+1}}) \cdot (H_{i+2}^{i+3*}) \cdots (H_{j-3}^{j-2*}) \cdot (GH_{j-1}^{j}) \\ + (H_{i+2} \not V P_{i+3}) \cdot (H_{i+4}^{i+5*}) \cdots (H_{j-3}^{j-2*}) \cdot (GH_{j-1}^{j}) \\ \vdots \\ + (\overline{H_{j-4}}) \cdot (H_{j-3}^{j-2*}) \cdot (GH_{j-1}^{j}) \\ + (H_{j-3} \not V P_{j-2}) \cdot (GH_{j-1}^{j}) \\ + (\overline{H_{j-2}}) \cdot (GH_{j-1}^{j}) + (H_{j-1} \not V P_j) \\ + (\overline{H_j}) + C_{j+1} \end{array} \right\}$$

The left bracket is one product term larger than that of equation (29) or (30), but the output carry of the string can share some of the product terms of the left bracket of the sum. The saving exceeds one product term for a string size greater than 4. However, the output carry of the string must be of the same polarity as the sum bit to enable sharing. In turn, succeeding strings would be of opposite polarity. It should also be noted that the output carry of the string using equation (31) or (32) should be modified to reflect this sharing. A shared product term will use $H_i \cdot H_{i+1}^{*}$ or $H_i \cdot H_{i+1}^{**}$ instead of $H_i^{j+1*}$ or $H_i^{j+1**}$, respectively, to reflect the fact that $H_i$ of the sum bit $S_i$ must remain intact without substitution.

For the high-order string, sum bits are generated as for an intermediate string, while the output carry is generated according to equations (35), (36), (37) or (38).

$$C_{out} = \{\overline{G_0^j}\} \not V \{\overline{H_0^j} + \overline{C_{j+1}}\} \tag{35}$$

$$= \left\{ \begin{array}{l} (\overline{GH_0^1}) \\ + (H_0^{1}) \cdot (\overline{GH_2^3}) \\ \vdots \\ + (H_0^{1}) \cdots (\overline{GH_{j-3}^{j-2}}) \\ + (H_0^{1}) \cdots (H_{j-3}^{j-2}) \cdot (\overline{G_{j-1}^{j}}) \end{array} \right\}$$

$$\not V$$

$$\left\{ \begin{array}{l} (H_0 \not V \overline{G_1}) \cdot (H_2^{3}) \cdots (H_{j-3}^{j-2}) \cdot (\overline{G_{j-1}^{j}}) \\ + (\overline{H_1}) \cdot (H_2^{3}) \cdots (H_{j-3}^{j-2}) \cdot (\overline{G_{j-1}^{j}}) \\ \vdots \\ + (\overline{H_{j-4}}) \cdot (H_{j-3}^{j-2**}) \cdot (\overline{G_{j-1}^{j}}) \\ + (H_{j-3} \not V \overline{G_{j-2}}) \cdot (\overline{G_{j-1}^{j}}) \\ + (\overline{H_{j-2}}) \cdot (\overline{G_{j-1}^{j}}) + (H_{j-1} \not V \overline{G_j}) \\ + (\overline{H_j}) + \overline{C_{j+1}} \end{array} \right\}$$

$$\overline{C_{out}} = \{G_0^j\} \not V \{\overline{H_0^j} + \overline{C_{j+1}}\} \tag{36}$$

$$= \left\{ \begin{array}{l} (G_0^1) \\ + (H_0 \cdot H_1^{*}) \cdot (G_2^3) \\ + (H_0 \cdot H_1^{*}) \cdot (H_2^{3*}) \cdot (G_4^5) \\ \vdots \\ + (H_0 \cdot H_1^{*}) \cdot (H_2^{3*}) \cdots (H_{j-3}^{j-2*}) \cdot (G_{j-1}^{j}) \end{array} \right\}$$

$$\not V$$

$$(\overline{H_0} \cdot H_1^{*}) \cdot (H_2^{3*}) \cdots (H_{j-3}^{j-2**}) \cdot (\overline{G_{j-1}^{j}})$$

$$\bar{C}_{out} = \left\{ \begin{array}{l} \vdots \\ +(\bar{H}_1) \cdot (H_2^{3}) \cdot \ldots \cdot (H_{j-3}^{j-2}) \cdot (\bar{G}_{j-1}^j) \\ \vdots \\ +(\bar{H}_{j-4}) \cdot (H_{j-3}^{j-2**}) \cdot (\bar{G}_{j-1}^j) \\ +(\bar{H}_{j-3} \not\!\!\!\!\vee \bar{G}_{j-2}) \cdot (\bar{G}_{j-1}^j) \\ +(\bar{H}_{j-2}) \cdot (\bar{G}_{j-1}^j) + (\bar{H}_{j-1} \not\!\!\!\!\vee \bar{G}_j) \\ +(\bar{H}_j) + \bar{C}_{j+1} \end{array} \right.$$

$$\bar{C}_{out} = \{ GH_0{}^j \} \not\!\!\!\vee \{ \bar{H}_0{}^j + C_{j+1} \} \quad (37)$$

$$= \left\{ \begin{array}{l} +(G_0{}^1) \\ +(H_0^{1*}) \cdot (G_2{}^3) \\ \vdots \\ +(H_0^{1*}) \cdot \ldots \cdot (G_{j-3}^{j-2}) \\ +(H_0^{1*}) \cdot \ldots \cdot (H_{j-3}^{j-2*}) \cdot (GH_{j-1}^j) \end{array} \right.$$

$\not\!\!\!\vee$ $$\left\{ \begin{array}{l} (H_0 \not\!\!\!\vee P_1) \cdot (H_2^{3*}) \cdot \ldots \cdot (H_{j-3}^{j-2*}) \cdot (GH_{j-1}^j) \\ +(\bar{H}_1) \cdot (H_2^{3*}) \cdot \ldots \cdot (H_{j-3}^{j-2*}) \cdot (GH_{j-1}^j) \\ \vdots \\ +(\bar{H}_{j-4}) \cdot (H_{j-3}^{j-2*}) \cdot (GH_{j-1}^j) \\ +(\bar{H}_{j-3} \not\!\!\!\vee P_{j-2}) \cdot (GH_{j-1}^j) \\ +(\bar{H}_{j-2}) \cdot (GH_{j-1}^j) + (H_{j-1} V P_j) \\ +(\bar{H}_j) + C_{j+1} \end{array} \right.$$

$$C_{out} = \{ \overline{GH_0{}^j} \} \not\!\!\!\vee \{ \bar{H}_0{}^j + C_{j+1} \} \quad (38)$$

$$= \left\{ \begin{array}{l} \overline{GH_0{}^1} \\ +(H_0 \cdot H_1^{}) \cdot (\overline{GH_2{}^3}) \\ +(H_0 \cdot H_1^{}) \cdot (H_2^{3}) \cdot (\overline{GH_4{}^5}) \\ \vdots \\ +(H_0 \cdot H^{}) \cdot (H_2^{3}) \cdot \ldots \cdot (H_{j-3}^{j-2}) \cdot (\overline{GH_{j-1}^j}) \end{array} \right.$$

$\not\!\!\!\vee$ $$\left\{ \begin{array}{l} (\bar{H}_0 \cdot H_1^*) \cdot (H_2^{3*}) \cdot \ldots \cdot (H_{j-3}^{j-2*}) \cdot (GH_{j-1}^j) \\ +(\bar{H}_1) \cdot (H_2^{3*}) \cdot \ldots \cdot (H_{j-3}^{j-2*}) \cdot (GH_{j-1}^j) \\ \vdots \\ +(\bar{H}_{j-4}) \cdot (H_{j-3}^{j-2**}) \cdot (GH_{j-1}^j) \\ +(\bar{H}_{j-3} \not\!\!\!\vee P_{j-2}) \cdot (GH_{j-1}^j) \\ +(\bar{H}_{j-2}) \cdot (GH_{j-1}^j) + (H_{j-1} \not\!\!\!\vee P_j) \\ +(\bar{H}_j) + C_{j+1} \end{array} \right.$$

For a high-order string of 2 or 4, no product term sharing of the left bracket of $C_{out}$ or $\bar{C}_{out}$ and the left bracket of $S_0$ or $\bar{S}_0$, is possible, so that the selected output carry can be of the same polarity as the high-order sum bit. Therefore, equation (35) or (37) is used with $S_0$ or $\bar{S}_0$, respectively. For a high-order string of 6 or greater, such sharing becomes economical, so that equation (36) or (38) is used with $S_0$ or $\bar{S}_0$, respectively, making the output carry of opposite polarity to that of the high-order sum bit.

String sizes are optimized in a manner similar to that used earlier but based on the following number of unique product terms per string.

$$\begin{array}{lll} T_{low} & = 1 & (39) \\ T_i & = (L+6)/2 & \text{for } K = 2 \\ & = [K(K-2) + 8 + L]/2 & \text{for } k > 2 \\ T_{high} & = 3 & \text{for } K = 2 \\ & = [K(K-2) + 8]/2 & \text{for } K > 2 \end{array}$$

An empirical procedure for optimally assigning string sizes begins at the low end with two strings of 2, three strings of 4, followed by sets of four strings each of next higher even size. When the number of bit positions are exhausted after a string has been assigned according to this procedure, or after one additional string of the highest size already assigned, the string assignment is final. If the remaining high-order bits comprise a string less than the adjacent string already assigned, the latter becomes the high-order string and the remainder is absorbed by the preceding strings as follows: The high-order string of the low-order set of strings is increased by 2, the high-order string of the next set of strings is increased by 2, etc., until the remainder is absorbed. Table 5 illustrates the procedure.

| First-pass String Assignment (Nos. are string sizes) | Final String Assignment |
|---|---|
| 4 4 4 2 2 | |
| 4 4 4 4 2 2 | no change |
| 6 4 4 4 2 2 | |
| + | |
| ∠ 6 4 4 4 2 2 | 6 4 4 4 4 2 |
| + + | |
| ∠ 6 4 4 4 2 2 | 6 6 4 4 4 2 |

+ above numbers marks strings to be increased by 2
/ through numbers marks remainder to be absorbed FIG. 7 illustrates the relevant parameters for 8-bit, 16-bit and 32-bit adders, showing 13, 35, and 99 product terms used, respectively.

Figure 8:
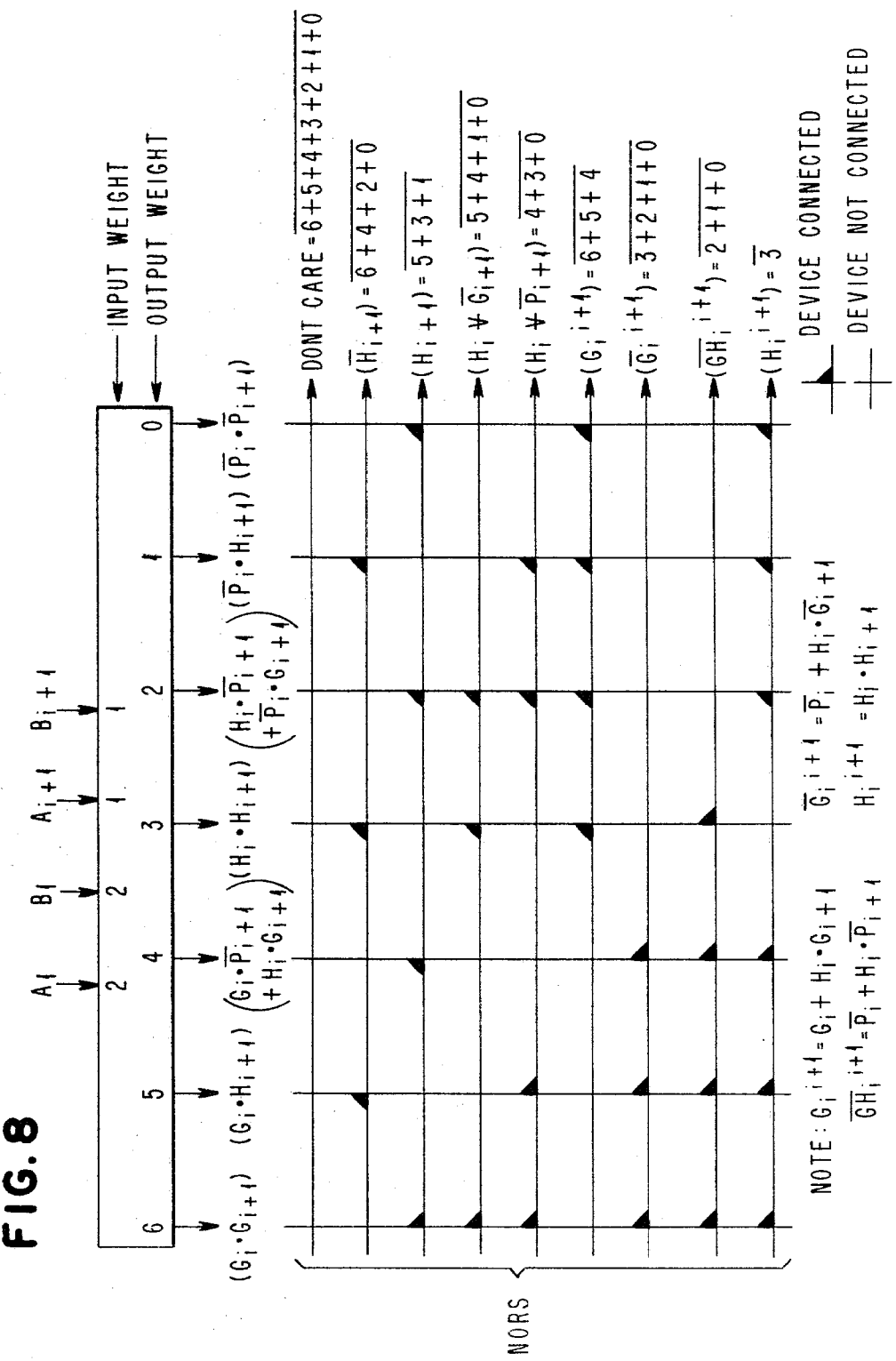
FIG. 8 is a diagram of a decoder that can be used with the adder of FIG. 6.

FIG. 8 illustrates the bit personalization for the various functions of a 4-bit special decoder. The decoder is an elementary symmetric function generator producing positive outputs and driving an AND array consisting of NORs. Note that a maximum of only six switching devices need to be provided for personalizing a function because the function requiring all seven columns to be connected is never used. It is assumed that a switching device located between two adjacent columns can be shared between the two columns. Also note that an elementary symmetric function is not connected if it is included in the desired function, corresponding to the rule for a conventional decoder with positive outputs driving an AND array consisting of NORs. If the AND array is implemented with ANDs the decoder should produce complement outputs.

Other expressions may be substituted for some of those in the AND array of FIG. 6 to reduce the number of device connections. For example, the complement of the inclusive 2-bit propagate function $\bar{G}_i{}^{i+1}$ may be substituted for the strict propagate function $H_i{}^{i+1}$ without affecting the outputs of the adder. The substitution reduces the maximum number of connections in FIG. 8 from 6 to 4. Rearranging the outputs of the decoder permits reducing the number of devices that need to be provided, even assuming that a device can be shared only between its two adjacent columns. As shown in FIG. 9 only 4 devices are needed for bit positions 10 and 11, and 5 devices for bit positions 8 and 9, to personalize the respective functions.

Figure 10:
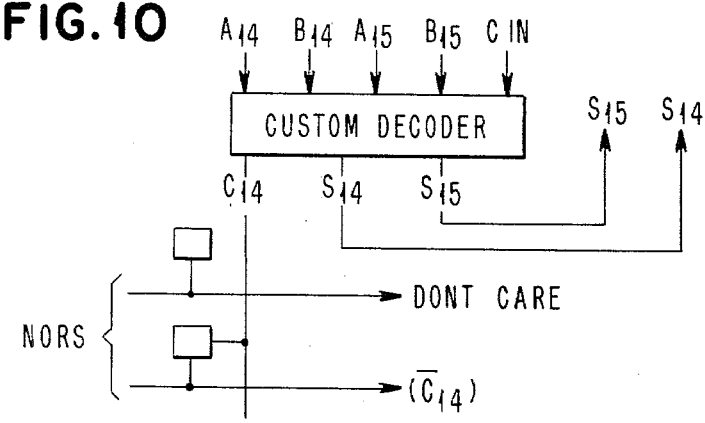
FIG. 10 is a diagram of a special decoder for low order bit positions in the adder of FIG. 6.

The 5-input custom decoder for inputs, $A_{14}$, $B_{14}$, $A_{15}$, $B_{15}$, and $C_{in}$, produces the two low-order sum bits directly, as well as the carry $C_{14}$ driving the AND array, as shown in FIG. 10. The positive $C_{14}$ is intended for the NOR implementation of the AND array in FIG. 6 where $\overline{C}_{14}$ is needed for several product terms. If the AND array is implemented with ANDs, the custom decoder should generate $\overline{C}_{14}$.

The width of the AND array reduces to 50 columns using the special decoders consisting of 7 elementary symmetric function generators with 7 columns each and the custom decoder with one column for the AND array.

Figure 11:
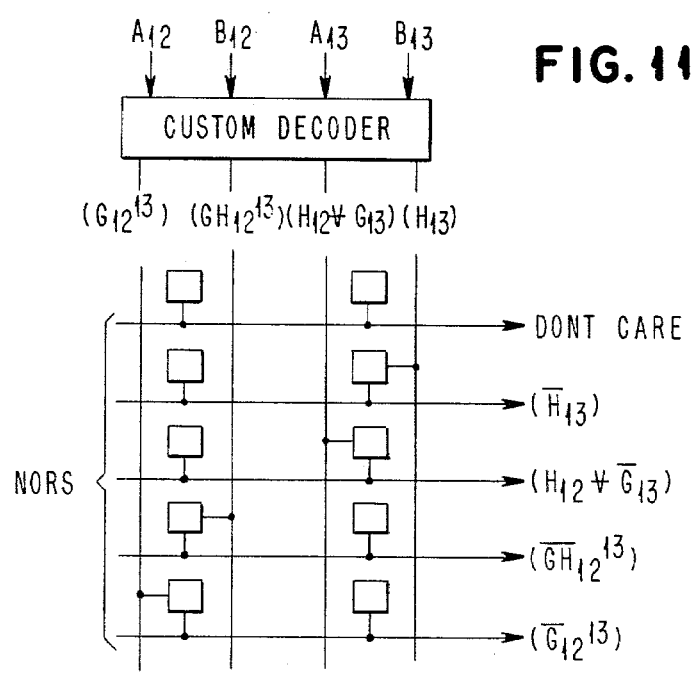
FIG. 11 is a diagram of a special decoder for positions 12 and 13 of the adder of FIG. 6.

If custom decoders replace the elementary symmetric function generators, the width of the AND array is further reduced. Moreover, still fewer devices are needed and only one device connection is made at the intersection of an AND array row with the outputs of a custom decoder. For example, FIG. 11 shows the custom decoder outputs for bit positions 12 and 13 of the 16-bit adder of FIG. 6, as well as the AND array personalization for the five unique functions the decoder must provide. Again, the decoder generates complement functions to drive a NOR implementation of the AND array. Based on the number of unique functions needed, the total width of the AND array of the 16-bit adder is reduced to 37.

Figure 12A:
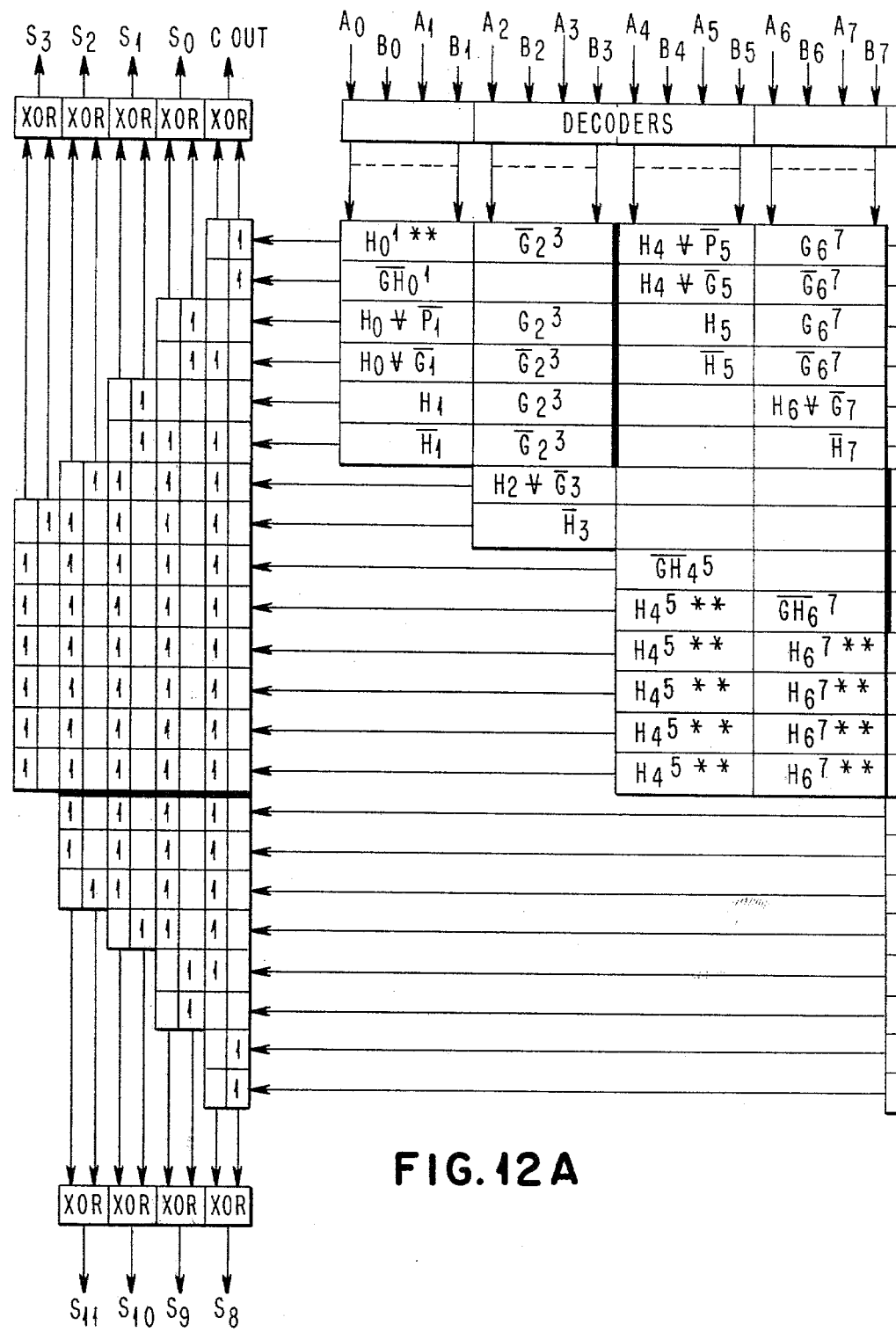
FIGS. 12A and 12B are diagrams of a compressed 16 bit adder.
Figure 12B:
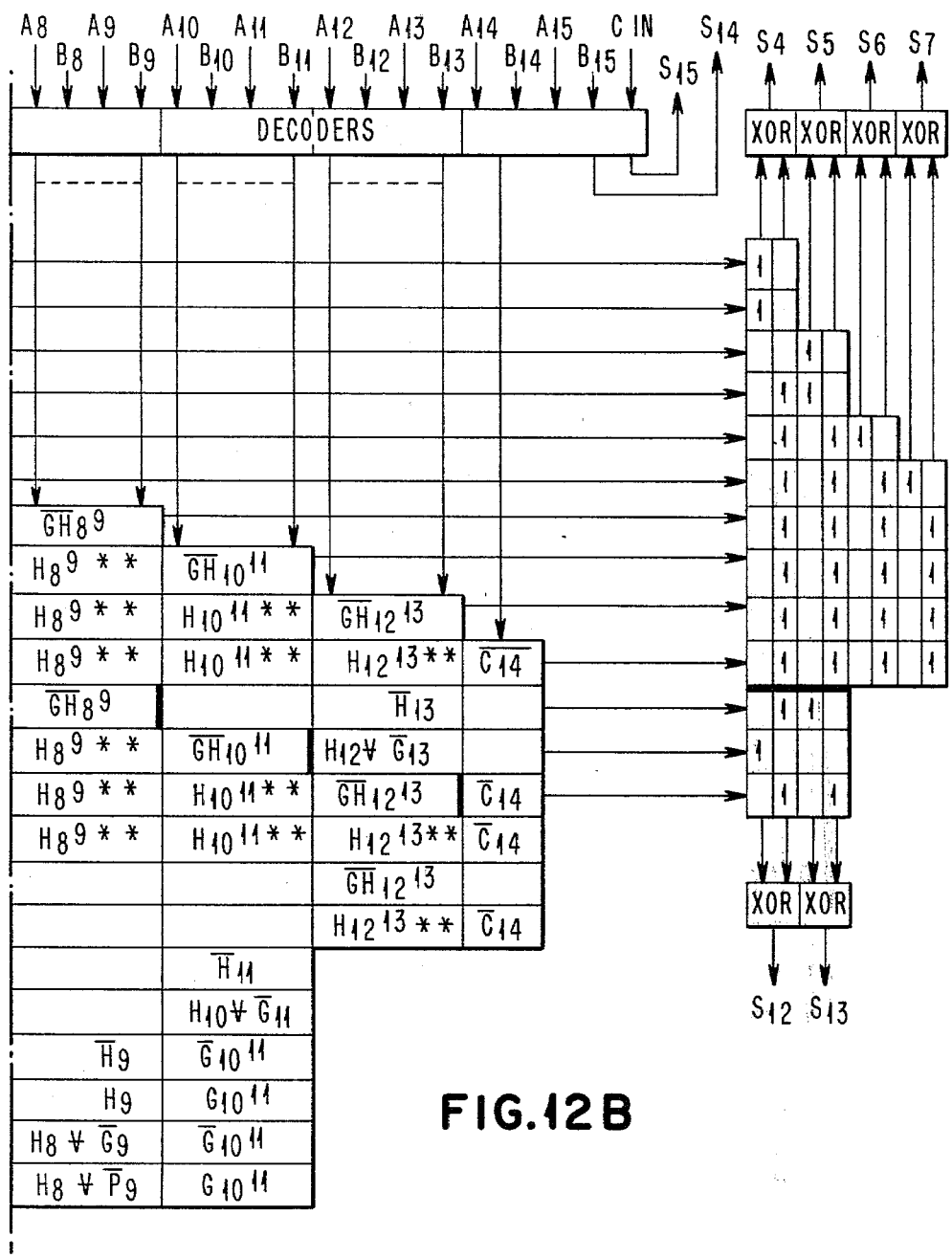

The 16-bit dedicated PLA adder can be further compressed horizontally and vertically using schemes which eliminate array sections of unconnected devices such as described in Weinberger U.S. Pat. No. 3,975,623. It will be noted in FIG. 6 that the arrays are rather sparsely populated with entries (representing connected devices). For example, the first row contains entries only in the columns of the low-order decoder in the AND array and of the sum bits $S_{12}$ and $S_{13}$ in the OR array. FIG. 12 illustrates a compressed 16-bit adder. First, the OR array is split into a left and a right part to permit an AND array row to be shared by two product terms. The left and right product terms sharing a row are shown separated with a heavy vertical line. Second, OR array columns are also shared between pairs of outputs, the split in the column shown by a heavy horizontal line. Third, the inputs and outputs are arranged to enable large sections of unused ends of rows of columns to be truncated. The number of AND array rows is reduced to 22, while the combined number of columns is reduced to 57 made up of 10 columns for the left OR array, 8 for the right OR array, and 6+4+6+6+6+6+4+1 for the custom decoder outputs driving the AND array.

Using custom decoders, it is possible to continue the trade-off between decoder complexity and array size. For example, with 4 adder bit position inputs to a decoder, custom decoders of 8 and 9 inputs may be used. The 9-input decoder would be assigned to the low-order 4-bit positions plus the input carry $C_{in}$. The decoder would generate the low-order 4 sum bits directly as well as the signal representing the carry out of the decoder inputs to drive the AND array.

When optimum string sizes are used, the number of product terms (and string sizes) needed for an 8-bit, 16-bit, and 32-bit adder is 6 (string sizes 4 and 9), 19 (string sizes 4,4,4, and 4) and 54 (string sizes 8,8,4,4,4, and 4), respectively. For the 32-bit adder the combined number of decoder outputs comprise only 52 columns.

With folding, that makes use of two split OR arrays, the adder can be further reduced to 30 rows and 70 columns of which 52 are for the AND array and 18 for the OR arrays.

If carried to the limit in which all inputs to the adder enter a single custom decoder, the "decoder" becomes a custom designed adder without the need of arrays.

Therefore from the description of the preferred embodiment of the invention one skilled in the art will recognize a variety of applications for the invention and appropriate modifications within the scope of the claims.

Having thus described my invention, what I claim as new, and desire to secure by Letters Patent is:

1. In a carry look ahead adder for the addition of two multi digit numbers $A_0, A_i \ldots A_{n-1}$ and $B_0, B_1 \ldots B_{n-1}$ (0 to n-1 high-to-low order) and an input carry digit $C_{in}$ to generate a multi digit binary sum $S_0, S_1 \ldots S_{n-1}$ and a carry out digit $C_{out}$ using programmable logic arrays each such programmable logic array including a plurality of multi bit input decoders feeding signals to a product term generating array which in turn feeds signals to a sum of product term generating array that supplies signals to Exclusive-OR circuits providing an Exclusive-OR function of two inputs, the improvement comprising:

means feeding like order digits $A_i$, $B_i$ of the two multi digit numbers to the same multi bit input decoder; and circuit means in the product term and sum of product term generating arrays to generate a sum digit $S_i$ as the output of one of the Exclusive-OR circuits in accordance with the following formula:

$$S_i = \begin{pmatrix} (H_i \not\!\vee \overline{G}_{i+1}) \cdot \overline{(GH}_{i+2}^{i+3}) \\ + (H_i \not\!\vee \overline{G}_{i+1}) \cdot (H_{i+2}^{i+3}) \cdot \overline{(GH}_{i+4}^{i+5}) \\ \cdot \\ \cdot \\ + (H_i \not\!\vee \overline{G}_{i+1}) \cdot (H_{i+2}^{i+3}) \cdot \ldots \cdot \overline{(GH}_{j-3}^{j-2}) \\ + (H_i \not\!\vee \overline{G}_{i+1}) \cdot (H_{i+2}^{i+3}) \cdot \ldots \cdot (H_{j-3}^{j-2}) \cdot (\overline{G}_{j-1}^j) \\ + (H_i \not\!\vee \overline{P}_{i+1}) \cdot (G_{i+2}^{i+3}) \\ + (H_i \not\!\vee \overline{P}_{i+1}) \cdot (H_{i+2}^{i+3}) \cdot (G_{i+4}^{i+5}) \\ \cdot \\ \cdot \\ + (H_i \not\!\vee \overline{P}_{i+1}) \cdot (H_{i+2}^{i+3}) \cdot \ldots \cdot (H_{j-3}^{j-2*}) \cdot (G_{j-1}^j) \end{pmatrix}$$

$$V \begin{pmatrix} (\overline{H}_{i+1}) \cdot (H_{i+2}^{i+3}) \cdot \ldots \cdot (H_{j-3}^{j-2}) \cdot (\overline{G}_{j-1}^j) \\ + (H_{i+2} \not\!\vee \overline{G}_{i+3}) \cdot (H_{i+4}^{i+5}) \cdot \ldots \cdot (H_{j-3}^{j-2}) \cdot (\overline{G}_{j-1}^j) \\ \cdot \\ \cdot \\ + (\overline{H}_{j-4}) \cdot (H_{j-3}^{j-2**}) \cdot (\overline{G}_{j-1}^j) \\ + (H_{j-3} \not\!\vee \overline{G}_{j-2}) \cdot (\overline{G}_{j-1}^j) \\ + (H_{j-2}) \cdot (\overline{G}_{j-1}^j) + (H_{j-1} \not\!\vee \overline{G}_j) \\ + (H_j) + C_{j+1} \end{pmatrix}$$

where  $G_i = A_i \cdot B_i$    $\overline{G}_1 = \overline{A}_i + \overline{B}_i$
       $P_i = A_i + B_i$    $\overline{P}_i = \overline{A}_1 \cdot \overline{B}_i$ $H_i = A_i \not\!\vee B_i$    $\overline{H}_1 = \overline{A_i \vee B_i}$ $i$ = ith bit position
$j$ = bit position of lower order than $i$.
$H^*$ is one of $A \not\!\vee B$ and $A + B$
$H^{**}$ is one of $A \not\!\vee B$ and $A + B$ 2. In a carry look ahead adder for the addition of two multi digit numbers $A_0, A_1 \ldots A_{n-1}$ and $B_0, B_1 \ldots B_{n-1}$ (0 to n-1 high-to-low order) and an input carry digit $C_{in}$ to generate a multi digit binary sum $S_0, S_1 \ldots S_{n-1}$ and a carry out digit $C_{out}$ using programmable logic arrays each such programmable logic array including a plurality of multi bit input decoders feeding signals to a product term generating array which in turn feeds signals to a sum of product term generating array that supplies signals to Exclusive-OR circuits providing an Exclusive-OR function of two inputs, the improvement comprising, means feeding like order digits $A_i$, $B_i$ of the two multi digit numbers to the same multi bit input decoder; and circuit means in the product term and sum of product term generating arrays to generate a sum digit $\overline{S_i}$ as the output of one of the Exclusive-OR circuits in accordance with the following formula:

$$\overline{S_i} = \left\{ \begin{array}{l} (H_i \not\!\vee P_{i+1}) \cdot (G_{i+2}^{i+3}) \\ +(H_i \not\!\vee P_{i+1}) \cdot (H_{i+2}^{i+3*}) \cdot (G_{i+4}^{i+5}) \\ \vdots \\ +(H_i \not\!\vee P_{i+1}) \cdot (H_{i+2}^{i+3*}) \cdot \ldots \cdot (G_{j-3}^{j-2}) \\ +(H_i \not\!\vee P_{i+1}) \cdot (H_{i+2}^{i+3*}) \cdot \ldots \cdot (H_{j-3}^{j-2*}) \cdot (GH_{j-1}^{j}) \\ +(H_i \not\!\vee G_{i+1}) \cdot (\overline{GH_{i+2}^{i+3}}) \\ +(H_i \not\!\vee G_{i+1}) \cdot (H_{i+2}^{i+3}) \cdot (\overline{GH_{i+4}^{i+5}}) \\ \vdots \\ +(H_i \not\!\vee G_{i+1}) \cdot (H_{i+2}^{i+3}) \cdot \ldots \cdot (H_{j-3}^{j-2**}) \cdot (\overline{GH_{j-1}^{j}}) \end{array} \right\}$$

$$\not\!\vee \left\{ \begin{array}{l} (\overline{H}_{i+1}) \cdot (H_{i+2}^{i+3*}) \cdot \ldots \cdot (H_{j-3}^{j-2*}) \cdot (GH_{j-1}^{j}) \\ +(H_{i+2} \not\!\vee P_{i+3}) \cdot (H_{i+4}^{i+5*}) \cdot \ldots \cdot (H_{j-3}^{j-2*}) \cdot (GH_{j-1}^{j}) \\ \vdots \\ +(\overline{H}_{j-4}) \cdot (H_{j-3}^{j-2*}) \cdot (GH_{j-1}^{j}) \\ +(H_{j-3} \not\!\vee P_{j-2}) \cdot (GH_{j-1}^{j}) \\ +(\overline{H}_{j-2}) \cdot (GH_{j-1}^{j}) + (H_{j-1} \not\!\vee P_j) \end{array} \right\}$$

where $G_i = A_i \cdot B_i$ $\overline{G_i} = \overline{A_i} + \overline{B_i}$ $P_i = A_i + B_i$ $\overline{P_i} = \overline{A_i} \cdot \overline{B_i}$ $P_i = A_i + B_i$ $\overline{P_i} = \overline{A_i} \, \overline{B_i}$ $H_i = A_i \not\!\vee B_i$ $\overline{H_i} = \overline{A_i \not\!\vee B_i}$ $i$ = ith bit position
$j$ = bit position of lower order than $i$
$H^*$ is one of $A \not\!\vee B$ and $A + B$
$H^{**}$ is one of $A \not\!\vee B$ and $\overline{A} + \overline{B}$ 3. In a carry look ahead adder for the addition of two multi digit numbers $A_0, A_1 \ldots A_{n-1}$ and $B_0, B_1 \ldots B_{n-1}$ (0 to n-1 high-to-low order) and an input carry digit $C_{in}$ to generate a multi digit binary sum $S_0, S_1, \ldots B_{n-1}$ and a carry out digit $C_{out}$ using programmable logic arrays each such programmable logic array including a plurality of two bit input decoders feeding signals to a product term generating array which in turn feeds signals to a sum of product term generating array that supplies signals to Exclusive-OR circuits providing an Exclusive-OR function of two inputs, the improvement comprising:

means feeding like order digits $A_i$ $B_i$ of the two multi digit numbers to the same two bit input decoder; and circuit means in the product term and sum of product term generating arrays to generate an intermediate order sum digit $S_i$ as the output of one of the Exclusive-OR circuits in accordance with the following formula:

$$\overline{S_i} = \left\{ \begin{array}{l} \overline{H_i} \cdot G_{i+1} \\ + \overline{H_i} \cdot H_{i+1}^* \cdot G_{i+2} \\ \vdots \\ + \overline{H_i} \cdot H_{i+1}^* \cdot \ldots \cdot H_{j-2}^* \cdot G_{j-1} \\ + \overline{H_i} \cdot H_{i+1}^* \cdot \ldots \cdot H_{j-2}^* \cdot H_{j-1}^* \cdot P_j \\ + H_i \cdot \overline{P}_{i+1} \\ + H_i \cdot H_{i+1}^{} \cdot \overline{P}_{i+2} \\ \vdots \\ + H_i \cdot H_{i+1}^{} \cdot \ldots \cdot H_{j-1}^{**} \cdot \overline{P_j} \end{array} \right\}$$

$\not\!\vee \{\overline{H}_{i+1} + \ldots + \overline{H}_j + C_{j+1}\}$ where
$G_i = A_i \cdot B_i$ $\overline{G_i} = \overline{A_i} + \overline{B_i}$ $P_i = A_i + B_i$ $\overline{P_i} = \overline{A_i} \cdot \overline{B_i}$ $H_i = A_i \vee B_i$ $\overline{H_i} = \overline{A_i \vee B_i}$ $i$ = bit position of sum
$j$ = bit position of lower-order than $i$
$H^*$ is one of $A \not\!\vee B$ and $A + B$
$H^{**}$ is one of $A \not\!\vee B$ and $\overline{A} + \overline{B}$.

4. In a carry look ahead adder for the addition of two multi digit numbers $A_0, A_1 \ldots A_{n-1}$ and $B_0, B_1 \ldots B_{n-1}$ (0 to n-1 high-to-low order) and an input carry digit $C_{in}$ to generate a multi digit binary sum $S_0, S_1 \ldots S_{n-1}$ and a carry out digit $C_{out}$ using programmable logic arrays each such programmable logic array including a plurality of two bit input decoders feeding signals to a product term generating array which in turn feeds signals to a sum of product term generating array that supplies signals to Exclusive-OR circuits providing an Exclusive-OR function of two inputs, the improvement comprising:

means feeding like order digits $A_i$, $B_i$ of the two multi digit numbers to the same two bit input decoder; and circuit means in the product term and sum of product term generating arrays to generate any intermediate order sum digit $S_i$ as the output of one of the Exclusive-OR circuits in accordance with the following formula:

$$S_i = \begin{pmatrix} \overline{H_i} \cdot \overline{P_{i+1}} \\ +\overline{H_i} \cdot H_{i+1}^{} \cdot \overline{P_{i+2}} \\ \cdot \\ \cdot \\ +\overline{H_i} \cdot H_{i+1}^{} \cdot \ldots \cdot H_{j-2}^{} \cdot \overline{P_{j-1}} \\ +\overline{H_i} \cdot H_{i+1}^{} \cdot \ldots \cdot H_{j-2}^{} \cdot H_{j-1}^{} \cdot \overline{G_j} \\ +H_i \cdot G_{i+1} \\ +H_i \cdot H_{i+1}^{*} \cdot G_{i+2} \\ \cdot \\ \cdot \\ +H_i \cdot H_{i+1}^{*} \cdot \ldots \cdot H_{j-1}^{*} \cdot G_j \end{pmatrix}$$

$$\not\!\!\forall \; \{\overline{H_{i+1}} + \ldots + \overline{H_j} + \overline{C_{j+1}}\}$$

where $$G_i = A_i \cdot B_i \; \overline{G_i} = \overline{A_i} + \overline{B_i}$$

$$P_i = A_i + B_i \; \overline{P_i} = \overline{A_i} \cdot \overline{B_i}$$

$$H_i = A_i \not\!\!\forall B_i \; \overline{H_i} = \overline{A_i \not\!\!\forall B_i}$$

i = bit position of sum
j = bit position of a lower-order than i
$H^*$ is one of $A \not\!\!\forall B$ and $\overline{A} + B$
$H^{**}$ is one of $A \not\!\!\forall B$ and $A + \overline{B}$.

5. The adder of claim 3 or 4 including circuit means in the product term and sum of product term arrays to generate any intermediate carry $C_i$ according to:

$$C_i = G_i \\ + H_i^* \cdot G_{i+1} \\ \cdot \\ \cdot \\ + H_i^* \cdot H_{i+1}^* \cdot \ldots \cdot H_{n-2}^* \cdot G_{n-1} \\ + H_i^* \cdot H_{i+1}^* \cdot \ldots \cdot H_{n-2}^* \cdot H_{n-1}^* \cdot C_{in}$$

6. The adder of claim 3 or 4 including circuit means in the product term and sum of product term arrays to generate any intermediate carry $C_i$ according to:

$$\overline{C_i} = \overline{P_i} \\ + H_i^{} \cdot \overline{P_{i+1}} \\ \cdot \\ \cdot \\ + H_i^{} \cdot H_{i+1} \cdot \ldots \cdot H_{n-2}^{} \cdot \overline{P_{n-1}} \\ + H_i^{} \cdot H_{i+1}^{} \cdot \ldots \cdot H_{n-2}^{} \cdot H_{n-1}^{**} \cdot \overline{C_{in}}$$

7. The adder of claim 3 or 4 including circuit means in the product term and sum of product term arrays and exclusive OR circuits generating an output carry $C_{out}$ equal to:

$$C_{out} = \begin{pmatrix} \overline{P_0} \\ + H_0 \cdot \overline{P_1} \\ \cdot \\ \cdot \\ + H_0 \cdot H_1^{} \cdot \ldots \cdot H_{j-1}^{} \cdot \overline{P_j} \end{pmatrix}$$

$$\not\!\!\forall \{\overline{H_0} + \ldots + \overline{H_j} + \overline{C_{j+1}}\}$$

8. The adder of claim 3 or 4 including circuit means in the product term and sum of product term arrays and exclusive OR circuits generating an output carry $C_{out}$ equal to:

$$\overline{C_{out}} = \begin{pmatrix} G_0 \\ + H_0 \cdot G_1 \\ \cdot \\ \cdot \\ + H_0 \cdot H_1^{*} \cdot \ldots \cdot H_{j-1}^{*} \cdot G_j \end{pmatrix}$$

$$\not\!\!\forall \{\overline{H_0} + \ldots + \overline{H_j} + \overline{C_{j+1}}\}$$

9. The adder of claim 3 or 4 including circuit means in the product term and sum of product term arrays and exclusive OR circuits to generate succeeding sum bits $S_j$ from any intermediate carry $C_{j+1}$ as follows:

$$\overline{S_j} = \{\overline{H_j}\} \not\!\!\forall \{C_{j+1}\}$$

$$\overline{S_{j-1}} = \begin{pmatrix} \overline{H_{j-1}} \cdot P_j \\ + H_{j-1} \cdot \overline{P_j} \end{pmatrix} \not\!\!\forall \{\overline{H_j} + C_{j+1}\}$$

10. The adder of claim 3 or 4 including circuit means in the product term and sum of product term arrays and exclusive OR circuits to generate succeeding sum bits $S_j$ from any intermediate carry $C_{j+1}$ as follows:

$$S_j = \{\overline{H_j}\} \not\!\!\forall \{\overline{C_{j+1}}\}$$

$$S_{j-1} = \begin{pmatrix} \overline{H_{j-1}} \cdot \overline{G_j} \\ + H_{j-1} \cdot G_j \end{pmatrix} \not\!\!\forall \{\overline{H_j} + \overline{C_{j+1}}\}$$

11. The adder of claim 3 or 4 including circuit means in the product term and sum of product term arrays for generating any particular intermediate string of sum bits $S_{n-l-k}, \ldots S_{n-l-1}$ having a length set by formula:

$$l = K^2 + K - 3$$

where l = the number of low-order bits preceding said string, K = the number of bits in said string.

12. The carry look ahead adder of claim 3 or 4 including circuit means in the product term and sum of product term arrays and exclusive OR circuits generating the low-order carry and sum digits in accordance with the following formulas:

$$S_{low} = \{H_{low} \cdot \overline{C_{in}}\} \not\!\!\forall \{\overline{H_{low}} \cdot C_{in}\}$$

$$\overline{C_{low}} = \overline{P_{low}} + \{H_{low} \cdot \overline{C_{in}}\}$$

13. The carry look ahead adder of claim 3 or 4 including circuit means in the product term and sum of product term arrays and exclusive OR circuits generating the low-order carry and sum digits in accordance with the following formulas:

$$\overline{S_{low}} = \{H_{low} \cdot C_{in}\} \not\!\!\forall \{\overline{H_{low}} \cdot \overline{C_{in}}\}$$

$$C_{low} = G_{low} + \{H_{low} \cdot C_{in}\}$$

* * * * *

UNITED STATES PATENT AND TRADEMARK OFFICE
CERTIFICATE OF CORRECTION

PATENT NO. : 4,348,736
DATED : Sep. 7, 1982
INVENTOR(S) : Arnold Weinberger

It is certified that error appears in the above–identified patent and that said Letters Patent are hereby corrected as shown below:

In the "Abstract", line 9, change the line to read --tions $A_i \cdot B_i$, $A_i \cdot \overline{B}_i$, $\overline{A}_i \cdot B_i$ and $\overline{A}_i \cdot \overline{B}_i$ of the true and comple---.

<u>In The Claims</u>

Col. 22, Claim 1, line 50, change "V" to --$\overline{V}$--.

Col. 23, Claim 3, line 62, change "$B_{n-1}$" to --$S_{n-1}$--;

Col. 24, Claim 3, line 10, change "$S_i$ to --$\overline{S}_i$--;

Col. 24, Claim 3, line 38, change "V" to --$\overline{V}$--, in both instances.

Signed and Sealed this

Twenty-fourth Day of January 1984

[SEAL]

Attest:

GERALD J. MOSSINGHOFF

Attesting Officer  Commissioner of Patents and Trademarks